(12) United States Patent
Li et al.

(10) Patent No.: US 10,776,562 B2
(45) Date of Patent: Sep. 15, 2020

(54) INFORMATION PROCESSING METHOD, TERMINAL, AND COMPUTER STORAGE MEDIUM FOR DYNAMIC OBJECT RENDERING BASED ON RESOURCE ITEM DISPLACEMENT STRATEGY

(71) Applicant: TENCENT TECHNOLOGY (SHENZHEN) COMPANY LIMITED, Shenzhen (CN)

(72) Inventors: Lieqiang Li, Shenzhen (CN); Xubo Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 14 days.

(21) Appl. No.: 16/207,749

(22) Filed: Dec. 3, 2018

(65) Prior Publication Data

US 2019/0102366 A1 Apr. 4, 2019

Related U.S. Application Data

(63) Continuation of application No. PCT/CN2017/103031, filed on Sep. 22, 2017.

(30) Foreign Application Priority Data

Sep. 30, 2016 (CN) .......................... 2016 1 0877820

(51) Int. Cl.
*G06F 40/106* (2020.01)
*G06F 9/451* (2018.01)
(Continued)

(52) U.S. Cl.
CPC ............ *G06F 40/106* (2020.01); *G06F 9/451* (2018.02); *G06F 16/972* (2019.01);
(Continued)

(58) Field of Classification Search
CPC ...... G06F 40/106; G06F 9/451; G06F 16/972; G06F 40/131; G06F 40/117
(Continued)

(56) References Cited

U.S. PATENT DOCUMENTS 8,095,892 B2 * 1/2012 Anthony ............. G06F 3/04815
715/851
8,291,349 B1 10/2012 Park et al.
(Continued)

FOREIGN PATENT DOCUMENTS

| CN | 102479052 A | 5/2012 |
| CN | 104750389 A | 7/2015 |

(Continued)

OTHER PUBLICATIONS

The World Intellectual Property Organization (WIPO) International Search Report for PCT/CN2017/103031 dated Dec. 27, 2017 6 Pages (including translation).
(Continued)

*Primary Examiner* — Stephen S Hong
*Assistant Examiner* — Broderick C Anderson
(74) *Attorney, Agent, or Firm* — Anova Law Group, PLLC

(57) ABSTRACT

An information processing method, a terminal, and a computer storage medium are provided. The method includes: rendering a target object in a first state on a terminal user interface; and detecting a first operation triggered in a browsing page containing the target object. The method also includes selecting a resource item displacement strategy matching a movement direction of the browsing page according to the first operation. At least two resource items of target object are obtained, each resource item being placed on one layer among multiple layers of the target object. The method also includes generating a dynamic
(Continued)

rendering style according to the resource item displacement strategy; and switching to render the target object in a second state according to the dynamic rendering style. The second state presents a dynamic display effect that the target object follows the first operation on the terminal user interface in a multi-layer unsynchronized manner.

12 Claims, 15 Drawing Sheets

(51) Int. Cl.
*G06F 16/958* (2019.01)
*G06F 40/117* (2020.01)
*G06F 40/131* (2020.01)
*G06F 3/0483* (2013.01)

(52) U.S. Cl.
CPC .......... *G06F 40/117* (2020.01); *G06F 40/131* (2020.01); *G06F 3/0483* (2013.01)

(58) Field of Classification Search
USPC .......................................................... 715/241
See application file for complete search history.

(56) References Cited

U.S. PATENT DOCUMENTS

| | | |
|---|---|---|
| 9,128,599 B2 | 9/2015 | Cho et al. |
| 2002/0033848 A1* | 3/2002 | Sciammarella ....... G06F 3/0481 715/838 |
| 2009/0007014 A1* | 1/2009 | Coomer ................ G06F 3/0482 715/830 |
| 2013/0050117 A1 | 2/2013 | Cho et al. |
| 2015/0091903 A1* | 4/2015 | Costello ................. G06T 15/20 345/426 |

FOREIGN PATENT DOCUMENTS

| | | |
|---|---|---|
| CN | 105045509 A | 11/2015 |
| CN | 106484416 A | 3/2017 |
| EP | 2458880 A2 | 5/2012 |

OTHER PUBLICATIONS

The European Patent Office (EPO) The Extended European Search Report for 17854782.4 dated May 20, 2020 12 Pages.

* cited by examiner

Advertising picture

Layered material (1)

Layered material (2)

The second-layer material is partially blocked

Slide up to display the second-layer content

INFORMATION PROCESSING METHOD, TERMINAL, AND COMPUTER STORAGE MEDIUM FOR DYNAMIC OBJECT RENDERING BASED ON RESOURCE ITEM DISPLACEMENT STRATEGY

CROSS-REFERENCES TO RELATED APPLICATIONS

This application is a continuation application of PCT Patent Application No. PCT/CN2017/103031, filed on Sep. 22, 2017, which claims priority to Chinese Patent Application No. 201610877820.8, filed on Sep. 30, 2016, the entire contents of both of which are incorporated herein by reference.

FIELD OF THE TECHNOLOGY

The present disclosure relates to network interaction technologies, and in particular, to an information processing method, a terminal, and a computer storage medium.

BACKGROUND OF THE DISCLOSURE

With the development of Internet technologies, information sending, information receiving, and information rendering are common means to share information between users. For example, an application scenario is sending customized information to a user, rendering the information after the user receives the information, where information rendering forms are static such as a paragraph of words and a picture. On one hand, information rendering manners are unitary; on the other hand, static information rendering does not have information interactivity, but an original purpose or a main objective of information sharing is to promote information sharing and spreading by means of interactions. However, the related technology has no effective solution to this problem.

SUMMARY

In view of this, embodiments of the present disclosure provide an information processing method, a terminal, and a computer storage medium, to at least resolve the problem in the existing technology.

The technical solutions of the embodiments of the present disclosure are implemented as follows:

An embodiment of the present disclosure provides an information processing method. The method includes: rendering, by a computing terminal, a target object in a first state on a terminal user interface; and detecting, by the computing terminal, a first operation triggered in a browsing page in which the target object resides. The method also includes determining, according to a parameter generated by the first operation, a movement direction of the browsing page; and selecting, by the computing terminal, a resource item displacement strategy matching the movement direction. The computing terminal obtains the least two resource items of target object are obtained, each resource item being placed on one layer among multiple layers of the target object. The method also includes generating, by the computing terminal, a dynamic rendering style according to the at least two resource items and the resource item displacement strategy; and switching, by the computing terminal, to render the target object in a second state according to the dynamic rendering style. The second state presents a dynamic display effect that the target object follows the first operation on the terminal user interface in a multi-layer unsynchronized manner.

An embodiment of the present disclosure provides a terminal. The terminal includes: a memory; and a processor coupled to the memory. The processor is configured to perform: rendering a target object in a first state on a terminal user interface; and detecting a first operation triggered in a browsing page in which the target object resides. The processor is also configured to perform: determining, according to a parameter generated by the first operation, a movement direction of the browsing page; and selecting a resource item displacement strategy matching the movement direction. At least two resource items of target object are obtained, each resource item being placed on one layer among multiple layers of the target object. The processor is also configured to perform: generating a dynamic rendering style according to the at least two resource items and the resource item displacement strategy; and switching to render the target object in a second state according to the dynamic rendering style. The second state presents a dynamic display effect that the target object follows the first operation on the terminal user interface in a multi-layer unsynchronized manner.

An embodiment of the present disclosure provides a non-transitory computer storage medium that stores computer program instructions executable by at least one processor. The computer executable instructions cause the at least one processor to perform: rendering a target object in a first state on a terminal user interface; and detecting a first operation triggered in a browsing page in which the target object resides. The computer executable instructions also cause the at least one processor to perform: determining, according to a parameter generated by the first operation, a movement direction of the browsing page; and selecting a resource item displacement strategy matching the movement direction. At least two resource items of target object are obtained, each resource item being placed on one layer among multiple layers of the target object. The computer executable instructions also cause the at least one processor to perform: generating a dynamic rendering style according to the at least two resource items and the resource item displacement strategy; and switching to render the target object in a second state according to the dynamic rendering style. The second state presents a dynamic display effect that the target object follows the first operation on the terminal user interface in a multi-layer unsynchronized manner.

DESCRIPTION OF EMBODIMENTS

Figure 1:
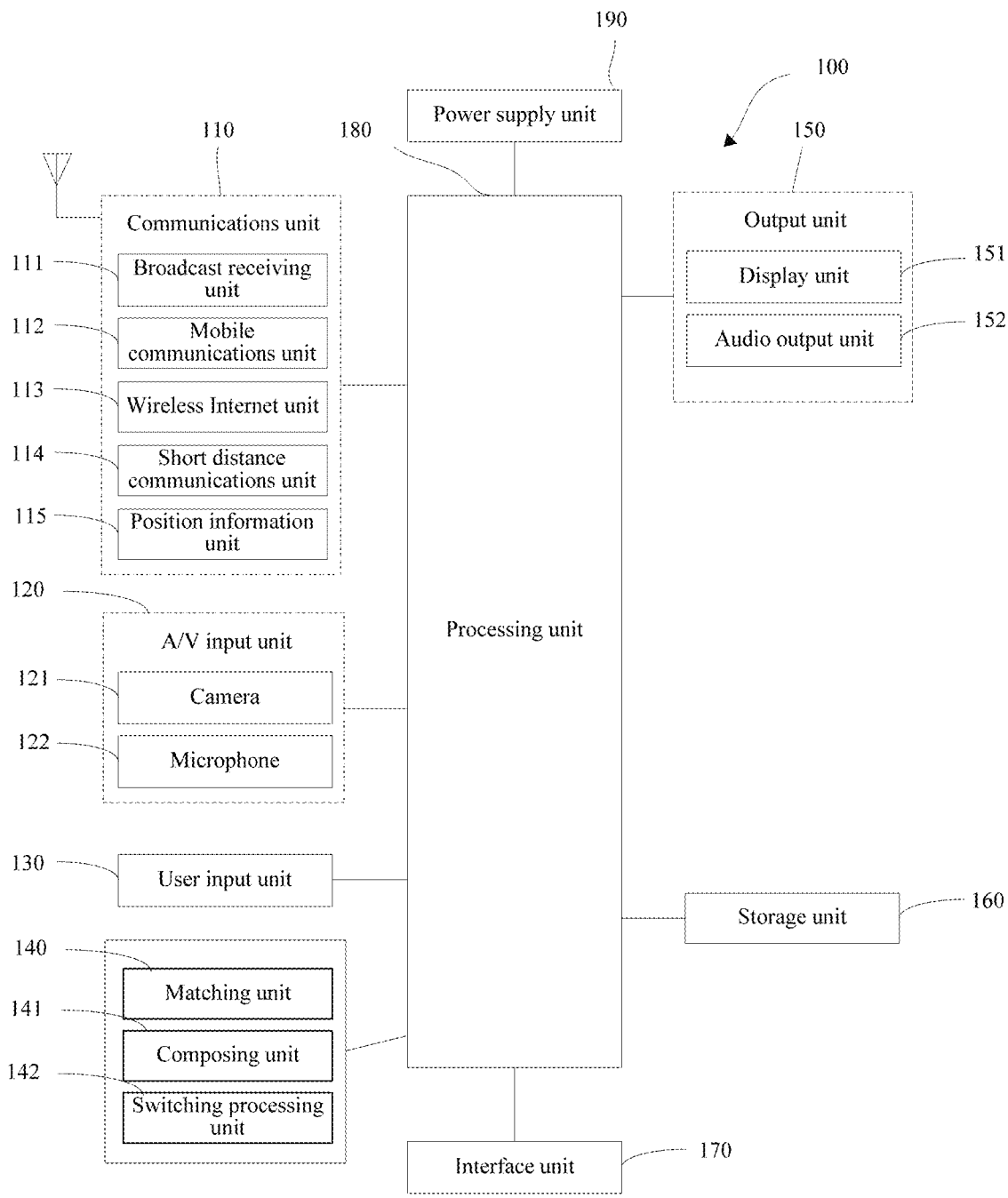
FIG. 1 is a schematic diagram of an optional hardware structure of a mobile terminal for implementing embodiments of the present disclosure.

The following further describes the implementations of the technical solutions in detail with reference to the accompanying drawings.

Now, a mobile terminal for implementing the embodiments of the present disclosure is described with reference to the accompanying drawings. In the subsequent descriptions, the suffix such as "module", "component", or "unit" used to represent an element is only used to help describe the embodiments of the present disclosure, and has no specific meaning by itself. Therefore, "module" and "component" may be mixed to use.

In the following detailed descriptions, many specific details are described to thoroughly understand the present disclosure. However, a person of ordinary skill in the art can obviously implement the present disclosure without these specific details. In other cases, disclosed known methods, processes, components, circuits, and networks are not described in detail, to avoid unnecessarily making aspects of the embodiments ambiguous.

In addition, although the terms "first", "second", and the like are repeatedly used in this specification to describe various elements (or various thresholds or various applications or various instructions or various operations), these elements (or thresholds or applications or instructions or operations) should not be limited by these terms. These terms are only used to distinguish one element (or threshold or application or instruction or operation) from another element (or threshold or application or instruction or operation). For example, a first operation may be referred to as a second operation and a second operation may also be referred to as a first operation without departing from the scope of the present disclosure. Both the first operation and the second operation are operations but are not the same operation.

Steps in the embodiments of the present disclosure are not necessarily processed according to the described step sequences. Steps may be selectively rearranged according to requirements, or steps in the embodiments may be deleted, or steps in the embodiments may be increased. The step descriptions in the embodiments of the present disclosure are only optional sequence combinations, but do not represent all step sequence combinations in the embodiments of the present disclosure. The step sequences in the embodiments cannot be regarded as limitations to the present disclosure.

The term "and/or" in the embodiments of the present disclosure refers to any and all possible combinations including one or more of related listed items. It needs to be further noted that, when being used in this specification, "include/comprise" specifies the existence of the described features, integers, steps, operations, elements and/or components, but does not exclude the existence or adding of one or more other features, integers, steps, operations, elements and/or components, and/or clusters thereof.

A smart terminal (such as a mobile terminal) in the embodiments of the present disclosure may be implemented in various forms. For example, the mobile terminal described in the embodiments of the present disclosure may include mobile terminals such as a mobile phone, a smartphone, a notebook computer, a digital broadcast receiver, a personal digital assistant (PDA), a tablet computer (PAD), a portable media player (PMP), and a navigation apparatus, and fixed terminals such as a digital TV and a desktop computer. It is assumed below that a terminal is a mobile terminal. However, a person skilled in the art may understand that, in addition to an element that is particularly used for the purpose of moving, a construction according to an implementation of the present disclosure can also be applied to a terminal of a fixed type.

FIG. 1 is a schematic diagram of an optional hardware structure of a mobile terminal for implementing embodiments of the present disclosure.

The mobile terminal 100 may include a communications unit 110, an audio/video (A/V) input unit 120, a user input unit 130, a matching unit 140, a composing unit 141, a switching processing unit 142, an output unit 150, a display unit 151, a storage unit 160, an interface unit 170, a processing unit 180, a power supply unit 190, and the like. FIG. 1 shows a mobile terminal with various components, but it should be understood that, not all shown components are required to be implemented. Alternatively, more or fewer components may be implemented. Elements of the mobile terminal are described below in detail.

The communications unit 110 generally includes one or more components, and allows radio communication between the mobile terminal 100 and a wireless communications system or a network (if the mobile terminal is replaced with a fixed terminal, electrical communication may also be performed in a wired manner). For example, when the communications unit is specifically a wireless communications unit, the communications unit may include at least one of a broadcast receiving unit 111, a mobile communications unit 112, a wireless Internet unit 113, a short distance communications unit 114, and a position information unit 115. These units are optional, and may be added or deleted according to different requirements.

The broadcast receiving unit 111 receives a broadcast signal and/or broadcast related information from an external broadcast management server via a broadcast channel. The broadcast channel may include a satellite channel and/or a terrestrial channel. The broadcast management server may be a server that generates and sends a broadcast signal and/or broadcast related information or a server that receives a broadcast signal and/or broadcast related information generated previously and sends the broadcast signal and/or the broadcast related information to a terminal. The broadcast signal may include a TV broadcast signal, a radio broadcast signal, a data broadcast signal, and the like. The broadcast signal may further include a broadcast signal combined with a TV broadcast signal or a radio broadcast signal. The broadcast related information may also be provided via a mobile communications network, and in this case, the broadcast related information may be received by the mobile communications unit 112. The broadcast signal may exist in various forms, for example, may exist in a form of a digital multimedia broadcasting (DMB) electronic program guide (EPG), a digital video broadcasting-handheld (DVB-H) electronic service guide (ESG), and the like. The broadcast receiving unit 111 may receive signal broadcasting by using various types of broadcast systems. Particularly, the broadcast receiving unit 111 may receive digital broadcasting by using a data broadcast system such as digital multimedia broadcasting-terrestrial (DMB-T), digital multimedia broadcasting-satellite (DMB-S), digital video broadcasting handheld (DVB-H), or media forward link only (MediaFLO), and a digital broadcast system such as integrated services digital broadcasting-terrestrial (ISDB-T). The broadcast receiving unit 111 may be constructed as various broadcast systems suitable for providing broadcast signals and the foregoing digital broadcast system. The broadcast signal and/or broadcast related information received via the broadcast receiving unit 111 may be stored in the memory 160 (or storage media of other types).

The mobile communications unit 112 sends a radio signal to at least one of a base station (such as an access point or a node B), an external terminal, and a server, and/or receives a radio signal from at least one of a base station, an external terminal, and a server. The radio signal may include a voice talk signal, a video talk signal, or various types of data sent and/or received according to a text and/or a multimedia message.

The wireless Internet unit 113 supports wireless Internet access of the mobile terminal. The unit may be internally or externally coupled to the terminal. Wireless Internet access technologies involved in the unit may include wireless local area network (Wi-Fi, WLAN), wireless broadband (Wibro), worldwide interoperability for microwave access (Wimax), and high speed downlink packet access (HSDPA).

The short distance communications unit 114 is a unit configured to support short distance communication. Some examples of a short distance communications technology include Bluetooth, Radio Frequency Identification (RFID), Infrared Data Association (IrDA), Ultra Wideband (UWB), ZigBee, and the like.

The position information unit 115 is a unit configured to check or obtain position information of the mobile terminal. A typical example of the position information unit is a global positioning system (GPS). According to the current technology, the GPS unit 115 calculates distance information from three or more satellites and accurate time information and applies a triangulation method to the calculated information, to accurately calculate current three-dimensional position information according to the longitude, latitude, and altitude. Currently, in the method used to calculate position and time information, three satellites are used and an error of the calculated position and time information is corrected by using another satellite. In addition, the GPS unit 115 can calculate speed information by continuously calculating current position information in real time.

The A/V input unit 120 is configured to receive an audio or video signal. The A/V input unit 120 may include a camera 121 and a microphone 122, and the camera 121 processes image data of a static picture or a video obtained by an image capture apparatus in a video capture mode or an image capture mode. A processed image frame may be displayed on the display unit 151. An image frame processed by the camera 121 may be stored in the storage unit 160 (or another storage medium) or sent via the communications unit 110, and two or more cameras 121 may be provided according to the construction of the mobile terminal. The microphone 122 may receive sound (audio data) in a running mode such as a phone talk mode, a recording mode, or a voice identification mode, and can process the sound into audio data. The processed audio (voice) data may be transferred, in a phone talk mode, to a format that may be sent to a mobile communication base station via the mobile communications unit 112 to output. The microphone 122 may implement various types of noise cancellation (or suppression) algorithms to cancel (or suppress) noise or interference generated in a process of receiving and sending an audio signal.

The user input unit 130 may generate key input data according to a command input by a user, to control various operations of the mobile terminal. The user input unit 130 allows the user to input various types of information, and may include a keyboard, a mouse, a touchpad (for example, a touch-sensitive component for detecting the change of resistance, voltage, capacitance, and the like caused by touch), a roller, a rocker, and the like. Particularly, when the touchpad overlays the display unit 151 in a layer form, a touch screen may be formed.

The matching unit 140 is configured to trigger a first operation in a browsing page in which the target object resides, determine, according to a parameter generated by the first operation, a movement direction of the browsing page, and select a resource item displacement strategy matched with the movement direction. A resource item, as used herein, may refer to any applicable digital item or object to be placed in a graphical user interface, such as one or more icons, images, videos, animated files, texts, or a combination thereof. The resource item displacement strategy, as used herein, refer to conditions and/or plans to move one or more resource items (e.g., move along at certain direction and for certain distance), i.e., to cause displacement of the one or more resource items. The composing unit 141 is configured to obtain at least two resource items of target object, and generate a dynamic rendering style of the target object according to the at least two resource items and the resource item displacement strategy. The switching processing unit 142 is configured to switch to a second state when the target object is rendered according to the dynamic rendering style, the second state presenting a dynamic display effect that the target object follows the first operation on the terminal user interface in a multi-layer unsynchronized manner. The display unit 151 is configured to render a target object in a first state on a terminal user interface. After a series of processing of the matching unit 140, the composing unit 141, and the switching processing unit 142, the display unit 151 is used to render the target object in a second state. In this case, the target object performs dynamic rendering of information on the terminal user interface in a multi-layer unsynchronized manner.

The interface unit 170 is used as an interface through which at least one external apparatus may be connected to the mobile terminal 100. For example, the external apparatus may include a wired or wireless headset port, an external power supply (or battery charger) port, a wired or wireless data port, a memory card port, a port used to connect to an apparatus with an identification unit, an audio input/output (I/O) port, a video I/O port, an earphone port, and the like. The identification unit may be configured to verify various information of the mobile terminal 100 used by a user and may include a user identifier module (UIM), a subscriber identity module (SIM), a universal subscriber identity module (USIM), and the like. In addition, the apparatus with an identification unit (referred to as an "identification apparatus" below) may use a smart card form. Therefore, the identification apparatus may be connected to the mobile terminal 100 via a port or another connection apparatus. The interface unit 170 may be configured to receive an input (such as data information or electric power) from an external apparatus and transmit the received input to one or more elements in the mobile terminal 100 or may be configured to transmit data between the mobile terminal and an external apparatus.

In addition, when the mobile terminal 100 is connected to an external base, the interface unit 170 may be used as a path allowing providing electric power from the base to the mobile terminal 100 or may be used as a path allowing various command signals input from the base to be transmitted to the mobile terminal. The various command signals input from the base or the electric power may be used as signals used to identify whether the mobile terminal is accurately installed on the base. The output unit 150 is constructed to provide an output signal (such as an audio signal, a video signal, or a vibration signal) in a visual, audio, and/or tactile manner. The output unit 150 may include a display unit 151, an audio output unit 152, and the like.

The display unit 151 may display information processed in the mobile terminal 100. For example, the mobile terminal 100 may display a related user interface (UI) or a graphical user interface (GUI). When the mobile terminal 100 is in a video talk mode or an image capture mode, the display unit 151 may display a captured image and/or a received image, and show the video or image and a UI or a GUI of a related function, and the like.

Meanwhile, when the display unit 151 and the touchpad overlay in a layer form to form a touch screen, the display unit 151 may be used as an input apparatus and an output apparatus. The display unit 151 may include at least one of a liquid crystal display (LCD), a thin film transistor-LCD (TFT-LCD), an organic light-emitting diode (OLED) display, a flexible display, a three-dimensional (3D) display, and the like. Some of these displays may be constructed to be transparent to allow a user to watch from the outside. These displays may be referred to as transparent displays. A typical transparent display may be a transparent organic light-emitting diode (TOLED) display. According to a specific expected implementation, the mobile terminal 100 may include two or more display units (or other display apparatuses). For example, the mobile terminal may include an external display unit (not shown) and an internal display unit (not shown). The touch screen may be used to detect a touch input pressure, a touch input position, and a touch input area.

When the mobile terminal is in a mode such as a call signal receiving mode, a talk mode, a recording mode, a voice identification mode, or a broadcast receiving mode, the audio output unit 152 may transfer the audio data received by the communications unit 110 or stored in the memory 160 into an audio signal and output the audio signal as sound. Moreover, the audio output unit 152 may provide an audio output (such as call signal receiving sound or message receiving sound) related to a specific function executed by the mobile terminal 100. The audio output unit 152 may include a loudspeaker, a buzzer, and the like.

The storage unit 160 may store a software program of a processing and control operation executed by the processing unit 180, and the like, or may temporarily store data (such as a phone book, a message, a static image, or a video) that has been output or that is about to be output. Moreover, the storage unit 160 may store data of vibration and audio signals in various manners output when the touch screen is touched.

The storage unit 160 may include at least one type of storage media, and the storage media includes a flash memory, a hard disk, a multimedia card, a card type memory (such as an SD or DX memory), a random access memory (RAM), a static random access memory (SRAM), a read only memory (ROM), an electrically erasable programmable read only memory (EEPROM), a programmable read only memory (PROM), a magnetic memory, a magnetic disk, an optical disc, and the like. Moreover, the mobile terminal 100 may be connected, by means of a network, to a network storage apparatus that executes a storage function of the storage unit 160 for cooperation.

The processing unit 180 generally controls total operations of the mobile terminal. For example, the processing unit 180 executes controlling and processing related to voice talk, data communication, video talk, and the like. For another example, the processing unit 180 may execute mode identification processing, to identify a handwriting input or a picture drawing input executed on the touch screen as a character or an image.

The power supply unit 190 receives external electric power or internal electric power under the control of the processing unit 180 and provides suitable electric power required for operating the elements and components.

The various implementations described herein may be implemented by using computer software, hardware, or a computer readable medium of any combination. For a hardware implementation, the implementations described herein may be implemented by using at least one of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electronic unit that is designed to execute the functions described herein. In some cases, such implementations may be implemented in a controller 180. For a software implementation, for example, an implementation of a process or a function may be implemented with an independent software unit that allows executing at least one function or operation. Software code may be implemented by a software application program (or program) compiled by any suitable programming language, and the software code may be stored in the memory 160 and executed by the controller 180.

So far, the mobile terminal has been described according to functions. For ease of description, among various types of mobile terminals such as a folded type, a straight type, a swinging type, and a sliding type mobile terminal, the following describes the sliding type mobile terminal as an example. Therefore, the present disclosure can be applied to any type of mobile terminal, and is not limited to the sliding type mobile terminal.

The mobile terminal 100 shown in FIG. 1 may be constructed to be operated by using wired and wireless communications systems in which data is sent via a frame or a packet and a communications system based on a satellite.

Now, a communications system that can be operated by the mobile terminal according to the embodiments of the present disclosure is described with reference to FIG. 2.

The communications system may use different air interfaces and/or physical layers. For example, air interfaces used in the communications system include, for example, Frequency Division Multiple Access (FDMA), Time Division Multiple Access (TDMA), Code Division Multiple Access (CDMA), Universal Mobile Telecommunications System (UMTS) (specifically, Long Term Evolution (LTE)), Global System for Mobile communications (GSM), and the like. As an unrestricted example, the following descriptions involve the CDMA communications system, but such guidance is also suitable for other types of systems.

Figure 2:
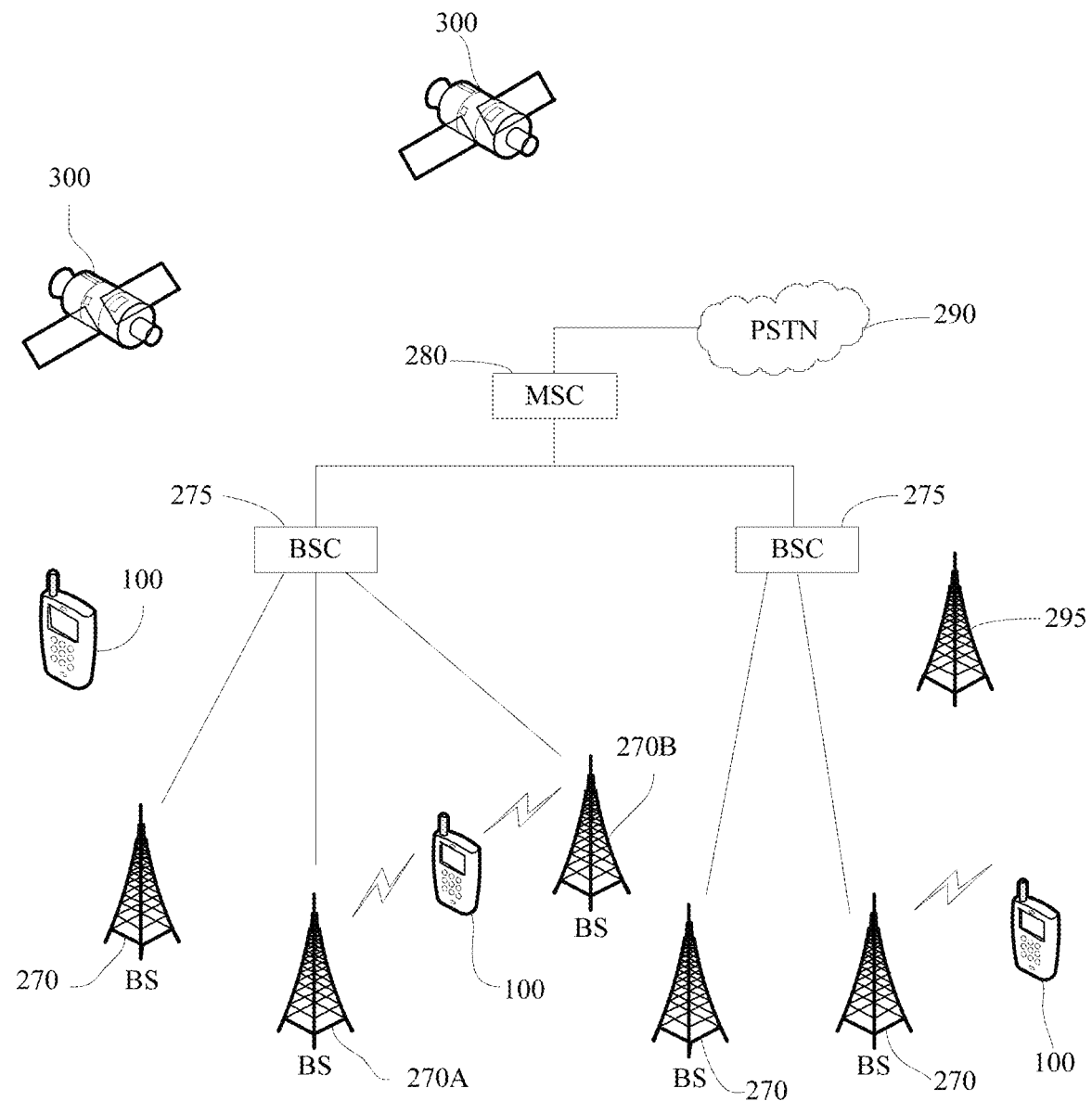
FIG. 2 is a schematic diagram of a communications system of the mobile terminal shown in FIG. 1.

Referring to FIG. 2, the CDMA wireless communications system may include multiple mobile terminals 100, multiple base stations (BS) 270, a base station controller (BSC) 275, and a mobile switching center (MSC) 280. The MSC 280 is constructed to form an interface with a public switched telephone network (PSTN) 290. The MSC 280 is further constructed to form an interface with a BSC 275 that may be coupled to the base station 270 via a backhaul line. The backhaul line may be constructed according to any one of several known interfaces, and the interface includes E1/T1, ATM, IP, PPP, a frame relay, HDSL, ADSL, or xDSL. It may be understood that, the system shown in FIG. 2 may include multiple BSCs 275.

Each BS 270 may serve one or more partitions (or areas), and each partition covered by an omnidirectional antenna or an antenna pointing to a specific direction is radially away from the BS 270. Alternatively, each partition may be covered by two or more antennas used for diversity reception. Each BS 270 may be constructed to support frequency assignments, and each frequency assignment has a specific spectrum (such as 1.25 MHz or 5 MHz).

A cross of a partition and a frequency assignment may be referred to as a CDMA channel. The BS 270 may also be referred to as a base transceiver station (BTS) or another equivalent term. In this case, the term "base station" may be used to generally represent a single BSC 275 and at least one BS 270. The base station may also be referred to as a "cellular station". Alternatively, partitions of a specific BS 270 may be referred to as multiple cellular stations.

As shown in FIG. 2, a broadcast transmitter (BT) 295 sends a broadcast signal to a mobile terminal 100 operating in the system. The broadcast receiving unit 111 shown in FIG. 1 is disposed at the mobile terminal 100 to receive the broadcast signal sent by the BT 295. FIG. 2 shows several satellites 300, for example, a GPS satellite 300 may be used. The satellite 300 helps locate at least one of multiple mobile terminals 100.

FIG. 2 shows multiple satellites 300, but it may be understood that, any quantity of satellites may be used to obtain useful positioning information. The position information unit 115 shown in FIG. 1 is generally constructed to cooperate with the satellite 300 to obtain expected positioning information. In place of a GPS tracking technology or in addition to a GPS tracking technology, another technology that may track a position of a mobile terminal may be used. In addition, at least one GPS satellite 300 may selectively or additionally process satellite DMB transmission.

As a typical operation of a wireless communications system, the BS 270 receives backward link signals from various mobile terminals 100. The mobile terminal 100 generally participates in talk and message receiving and sending and other types of communication. Each backward link signal received by a specific base station 270 is processed in a specific BS 270. Obtained data is transferred to a related BSC 275. The BSC provides a talk resource allocation and a mobile management function including coordination of a soft switching process between the BSs 270. The BSC 275 further routes the received data to the MSC 280, which provides an additional routing service used to form an interface with the PSTN 290. Similarly, the PSTN 290 and the MSC 280 form an interface, the MSC and the BSC 275 form an interface, and the BSC 275 correspondingly controls the BS 270 to send a forward link signal to the mobile terminal 100.

The mobile communications unit 112 of the communications unit 110 in the mobile terminal accesses the mobile communications network based on necessary data (including user identification information and authentication information) of a mobile communications network (such as 2G/3G/4G mobile communications networks) in the mobile terminal, to transmit mobile communication data (including uplink mobile communication data and downlink mobile communication data) for services of a mobile terminal user, such as webpage browsing and network multimedia playing.

The wireless Internet unit 113 of the communications unit 110 runs a related protocol function of a wireless hotspot to implement the function of the wireless hotspot. The wireless hotspot supports access of multiple mobile terminals (any mobile terminal except the mobile terminal), and multiplexes a mobile communication connection between the mobile communications unit 112 and the mobile communications network, to transmit mobile communication data (including uplink mobile communication data and downlink mobile communication data) for services of a mobile terminal user, such as webpage browsing and network multimedia playing. Because the mobile terminal essentially multiplexes the mobile communication connection between the mobile terminal and the communications network to transmit mobile communication data, traffic of the mobile communication data consumed by the mobile terminal is counted into communication fees of the mobile terminal by a charging entity of a communications network side, to consume data traffic of the mobile communication data included in the communication fees that the mobile terminal contracts to use.

Figure 3:
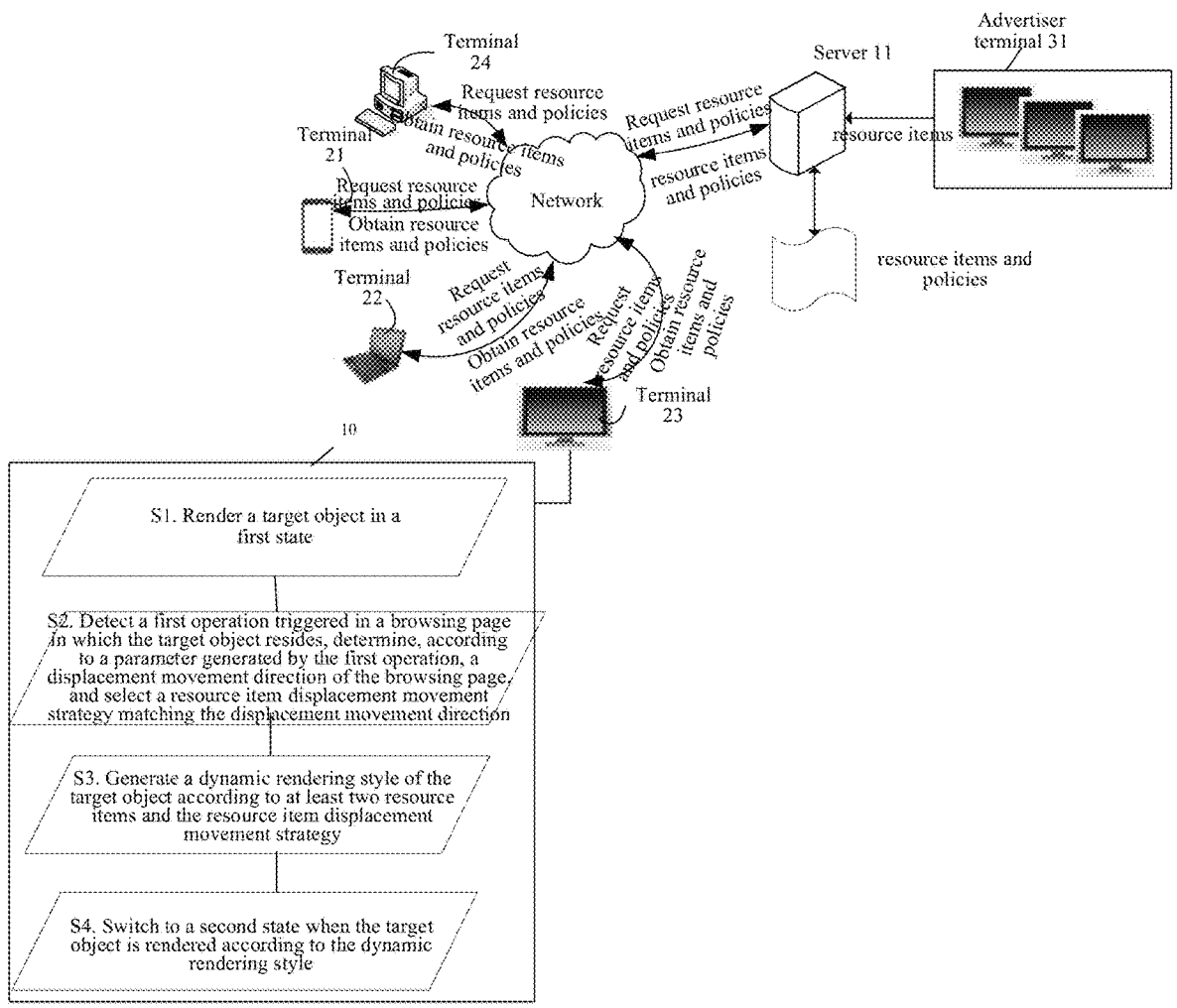
FIG. 3 is a schematic diagram of hardware entities of all parties that perform information interactions according to an embodiment of the present disclosure.

FIG. 3 is a schematic diagram of hardware entities of all parties that perform information interactions according to an embodiment of the present disclosure. FIG. 3 includes: a server 11, terminal devices 21 to 24, and an advertiser terminal 31 that provides an original resource item or provides a target object that needs to be finally put to the terminal devices 21 to 24. The terminal devices 21 to 24 exchange information with the server 11 by using a wired network or a wireless network. The server 11 is connected to the advertiser terminal 31, so as to obtain the original resource item or the target object that needs to be finally put to the terminal devices 21 to 24. The terminal device includes a mobile phone, a desktop computer, a PC computer, an all-in-one machine, and the like. By using this embodiment of the present disclosure, a server is used as a data source, and original data (such as an original resource item or a target object that needs to be finally put to the terminal device) obtained from the advertiser terminal 31 and a preset policy are provided to the terminal device for use, so that after the interacted first operation is triggered, the terminal device targetedly selects, from the preset policy according to a displacement caused by the first operation, a resource item displacement strategy that meets a current operation scenario, and obtains, according to the original data and the resource item displacement strategy, a dynamic target object that can be finally rendered on a terminal user interface, to replace the target object in a static state before the first operation is triggered. Herein, a dynamic rendering style of the target object needs to be generated according to the original data and the resource item displacement strategy, and then the dynamic target object rendered on the terminal user interface is finally obtained based on the dynamic rendering style. Certainly, the dynamic rendering style of the target object may be generated at a terminal side or may be directly provided to the terminal device for use after being preprocessed at a server side. At a terminal device side, the terminal device 23 is used as an example to describe a processing logic about how the terminal side generates the dynamic rendering style of the target object and finally renders the dynamic target object. The processing logic 10 includes: S1. rendering a target object in a first state on a terminal user interface; S2. triggering a first operation in a browsing page in which the target object resides, determining, according to a parameter generated by the first operation, a movement direction of the browsing page, and selecting a resource item displacement strategy matched with the movement direction; S3. obtaining at least two resource items of target object, and generating a dynamic rendering style of the target object according to the at least two resource items and the resource item displacement strategy; and S4. switching to a second state when the target object is rendered according to the dynamic rendering style, the second state presenting a dynamic display effect that the target object follows the first operation on the terminal user interface in a multi-layer unsynchronized manner.

The foregoing example in FIG. 3 is only a system architecture instance for implementing the embodiments of the present disclosure, and this embodiment of the present disclosure is not limited to the foregoing system structure in FIG. 3. The method embodiments of the present disclosure are provided based on the hardware structure of the mobile terminal 100 in FIG. 1, the communications system in FIG. 2, and the system architecture in FIG. 3.

In this specification, the resource item displacement strategy is used as a policy that multiple resource items are integrated, based on a displacement, as an image object that can perform dynamic rendering. The policy may be configured at the terminal, and the policy is extracted according to an interaction (such as a first operation) between a user and the terminal for processing, or the policy may be configured at the server, and after receiving a request generated by an interaction (such as a first operation) between a user and the terminal, the server responds to the request, and sends the policy to the terminal during the responding for use.

Figure 4:
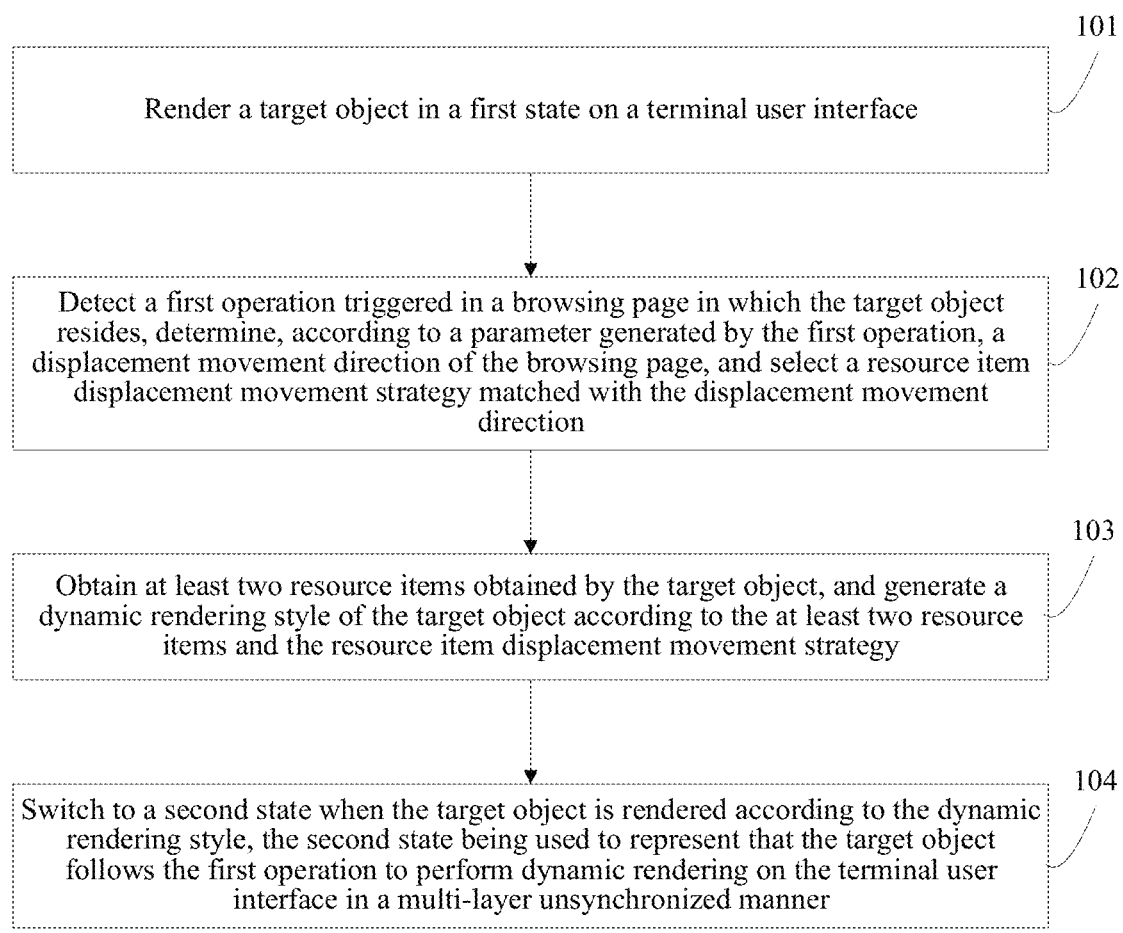
FIG. 4 is a schematic diagram of an interaction between a terminal and a server according to one embodiment of the present disclosure.

An embodiment of the present disclosure provides an information processing method. As shown in FIG. 4, the method includes:

Step 101. Render a target object in a first state on a terminal user interface.

Herein, the first state may be a static state, and exist as an initial state before the first operation is triggered. The first state (static) is that a user first sees a static picture. After the first operation is triggered, the static picture seen by the user may render a multi-layer unsynchronized stereoscopic effect, that is, change from the first state (static) to a second state (dynamic). That is, the initially static picture obtains a dynamic rendering result based on the first operation, and the rendering effect is formed by reflecting a change on angle of view (e.g., the angle of view of the user is changing as the page is moving up/down based on the first operation of the user) in a multi-layer manner to form a parallax. The dynamic rendering includes: a change of a displacement, a change of a direction, a change of an angle, and the like. The dynamic rendering may further include: a transparent color, a semitransparent color, and a gradient of color brightness in a rendering state; or may be combined with the change of a displacement, the change of a direction, the change of an angle, and the like to render.

Step 102. Detect a first operation triggered in a browsing page in which the target object resides, determine, according to a parameter generated by the first operation, a movement direction of the browsing page, and select a resource item displacement strategy matched with the movement direction.

Herein, after the first operation is triggered in the browsing page in which the target object resides, the parameter generated correspondingly by a displacement caused by the first operation is received, and the parameter is used as the parameter generated based on the first operation.

Herein, the first operation includes: a gesture sliding operation or a mouse scrolling operation. An example is: The first operation is triggered when the browsing page in which the target object resides is browsed, and the first operation may cause the browsing page (or the target object) to move up or move down. Certainly, it may also be the changes mentioned in the foregoing steps except the change of a displacement, such as the change of a direction and the change of an angle, and the transparent color, the semitransparent color, and the gradient of color brightness in a rendering state. The change of a displacement is not limited to moving up or down, and further include moving to the left or to the right.

Herein, for example, if the first operation causes a displacement (e.g., a displacement of elements in the browsing page), a resource item displacement strategy that meets a current operation scenario is targetedly selected from a preset policy according to the displacement, so that a dynamic target object that can be rendered on the terminal user interface is obtained subsequently according to the original data and the resource item displacement strategy.

Step 103. Obtain at least two resource items of target object, and generate a dynamic rendering style of the target object according to the at least two resource items and the resource item displacement strategy. Each resource item is placed on one layer among multiple layers of the target object.

Herein, after the interacted first operation is triggered, a terminal device targetedly selects, from the preset policy according to the displacement caused by the first operation, the resource item displacement strategy that meets a current operation scenario, so as to subsequently obtain, according to the original data and the resource item displacement strategy, the dynamic target object that can be rendered on the terminal user interface, to replace the target object in a static state before the first operation is triggered. First, a dynamic rendering style of the target object needs to be generated according to the original data and the resource item displacement strategy, and then the dynamic target object rendered on the terminal user interface is obtained based on the dynamic rendering style. Certainly, the dynamic rendering style of the target object may be generated at a terminal side or may be directly provided to the terminal device for use after being preprocessed at a server side. The original data may be multiple resource items obtained by decomposing the target object in advance (or multiple resource items that are elements of the target object and constitute the target object), and the multiple resource items are a prerequisite for forming a multi-layer unsynchronized rendering manner.

Step 104. Switch to render the target object in a second state according to the dynamic rendering style, the second state presenting a dynamic display effect that the target object follows the first operation on the terminal user interface in a multi-layer unsynchronized manner.

Herein, the first state (static) is that a user first sees a static picture. After the first operation is triggered, the static picture seen by the user may render a multi-layer unsynchronized stereoscopic effect, that is, change from the first state (static) to a second state (dynamic). Specifically, because the state change of this application from the static state to the dynamic state is caused based on the displacement caused by the interactive first operation, the second state is used to represent that the target object follows the first operation to perform dynamical rendering on the terminal user interface in a multi-layer unsynchronized manner. The dynamic rendering is a multi-layer unsynchronized stereoscopic effect. Based on the first operation (such as gesture sliding or mouse scrolling, any operation that can cause a displacement of a target object on a page), a picture in the browsing page initially appeared as static can obtain a dynamic picture rendering result in the browsing page, and the rendering effect is formed by reflecting a change on angle of view in a multi-layer manner to form a parallax.

By using this embodiment of the present disclosure, multiple resource items and a dynamic mechanism are used to obtain a multi-layer unsynchronized dynamic rendering effect. Specifically, the multiple resource items of the target object may be integrated according to a dynamic combination policy or algorithm. An example is: The composing/combination prerequisite is performing composing/integration according to a comparison between the center of a screen and the center of an advertising area (or referred to as the center of an area in which the target object resides). First, the terminal device senses the first operation that acts on the device, and renders a correspondingly generated dynamic picture to a user based on the foregoing composing prerequisite and a specific policy, to achieve a multi-layer unsynchronized stereoscopic effect of the picture. That is: 1) sense a user operation; and 2) generate and render a dynamic picture according to the user operation. The dynamic picture is generated according to multiple resource items and policies.

With the multiple resource items and the corresponding resource item displacement strategy, the dynamic rendering style of the target object that is rendered on the terminal may be obtained, and therefore, the basis of changing the target object from a static state to a dynamic state according to the first operation is included. Then, an interactive response is performed to respond to the first operation, to switch the target object to a second state when the target object is rendered according to the dynamic rendering style. The second state is used to represent that the target object follows the first operation to perform dynamic rendering on the terminal user interface in a multi-layer unsynchronized manner. A final information dynamic rendering form is obtained based on an interaction of an interactive operation, thereby promoting information sharing and spreading.

Figure 5:
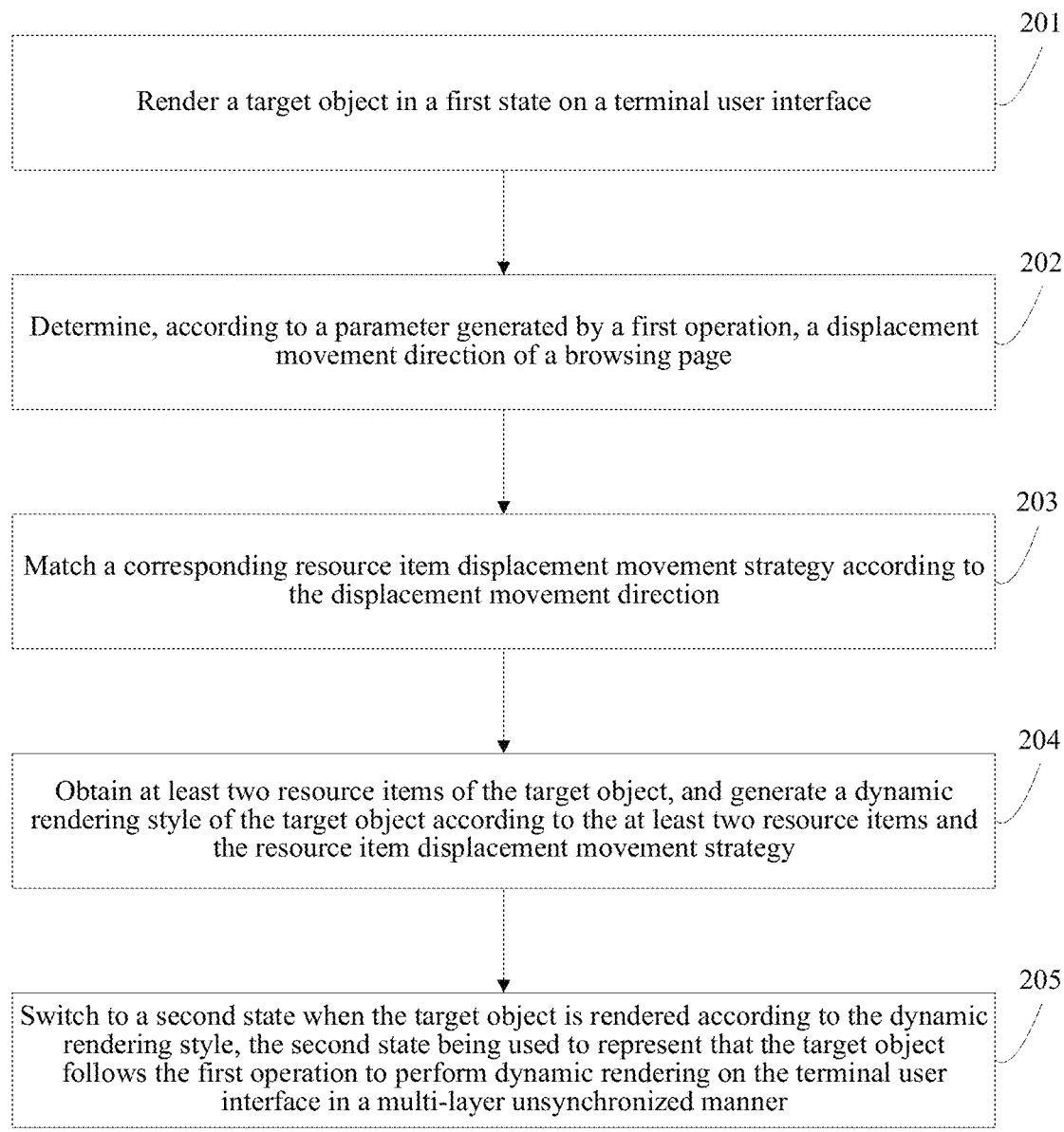
FIG. 5 is a schematic diagram of an interaction between a terminal and a server according to one embodiment of the present disclosure.

An embodiment of the present disclosure provides an information processing method. As shown in FIG. 5, the method includes:

Step 201. Render a target object in a first state on a terminal user interface.

Herein, the first state may be a static state, and exist as an initial state before the first operation is triggered. The first state (static) is that a user first sees a static picture. After the first operation is triggered, the static picture seen by the user may render a multi-layer unsynchronized stereoscopic effect, that is, change from the first state (static) to a second state (dynamic). That is, the initially static picture obtains a dynamic rendering result based on the first operation, and the rendering effect is formed by reflecting a change on angle of view in a multi-layer manner to form a parallax. The dynamic rendering includes: a change of a displacement, a change of a direction, a change of an angle, and the like. The dynamic rendering may further include: a transparent color, a semitransparent color, and a gradient of color brightness in a rendering state; or may be combined with the change of a displacement, the change of a direction, the change of an angle, and the like to render.

Step 202. Determine, according to a parameter generated by a first operation, a movement direction of a browsing page.

Step 203. Matching a corresponding resource item displacement strategy according to the movement direction.

By means of step 202 to step 203, the first operation is triggered in the browsing page in which the target object resides, and the corresponding resource item displacement strategy is matched from the preset policy according to the parameter generated by the first operation. Because the resource item displacement strategy is different according to an up, down, left, or right displacement brought by the first operation, or a different resource item selected for composing a target object, a final information dynamic rendering effect obtained according to the resource item displacement strategy is also diversified.

In an actual application, the first operation is triggered when the browsing page in which the target object resides is browsed, and the first operation may cause the browsing page (or the target object) to move up or move down. The first operation is not limited to a gesture sliding operation triggered during page browsing, such as a gesture sliding up or gesture sliding down operation, and may also be a mouse scrolling operation triggered during page browsing, such as a mouse scrolling up or mouse scrolling down operation. Different resource item displacement strategies in the preset policy need to be targetedly used for up moving or down moving of the browsing page (or referred to as target object) brought by different first operations. The resource item displacement strategy may perform composing/combination according to a comparison between the center of a screen and the center of an advertising area (or referred to as the center of an area in which the target object resides). For example, 1) Load resource item pictures by layers stored at a server end (i.e., each layer containing one or more corresponding resource item picture), add the resource item pictures to queue A, obtain a Y-axis coordinate of a point at the middle of a screen display area showing the page and denote the Y-axis coordinate as value b, obtain a Y-axis coordinate of a point at the center of a target area designated for the target object (e.g., an advertising area) which is denoted as value c, and compare value b and value c. 2) If b is greater than c, it indicates that the target area is in an upper position of the display screen; if b is less than c, it indicates that the target area is in a lower position of the display screen; and if b is equal to c, it indicates that the target area is in the middle of the screen. For the several different scenarios, different resource item displacement strategies are used, and, final dynamic rendering effects obtained according to the resource item displacement strategies are also different and are diversified. 3) After the corresponding resource item displacement strategies are selected according to different scenarios, adjust coordinates of the resource items in queue A according to the difference between b and c, to form the target object, including: performing, by using the difference between b and c as a base value, layer-by-layer coordinate adjustment for resource items in queue A separately. That is, a coordinate adjustment of a resource item relative to the target area is determined according to the base value and a layer on which the resource item is placed. In other words, besides moving the entire target area in accordance with the first operation of the user in a regular approach, relative positions of resource items in different layers of the target object may also be changed in an unsynchronized manner (e.g., coordinates of different layers are changed by different adjustment values) to create a dynamic stereo effect. A larger difference between b and c indicates a greater displacement distance between layers. For example, the target object may have n layers of resource item pictures, n being an integer greater than 1. Assuming that a parallax ratio (e.g., interlayer displacement difference ratio that creates a depth/stereo effect) is denoted as p, the base value is denoted as bv, a difference between a coordinate value of the i-th layer when the target area is at the center of the screen and a current coordinate value/position of an i-th layer resource item picture may be obtained as bv*p*(i−1), i being from 1 to n. If the first operation when a user slides or scrolls a browsing page causes changes of base value, repeat/loop the foregoing three processes. How to select corresponding resource item displacement strategies according to different scenarios is described in the subsequent embodiments.

Herein, after the first operation is triggered in the browsing page in which the target object resides, the parameter generated correspondingly by a displacement caused by the first operation is received, and the parameter is used as the parameter generated based on the first operation.

Herein, the first operation includes: a gesture sliding operation or a mouse scrolling operation. An example is: The first operation is triggered when the browsing page in which the target object resides is browsed, and the first operation may cause the browsing page (or the target object) to move up or move down. Certainly, it may also be the changes mentioned in the foregoing steps except the change of a displacement, such as the change of a direction and the change of an angle, and the transparent color, the semitransparent color, and the gradient of color brightness in a rendering state. The change of a displacement is not limited to moving up or down, and further includes moving to the left or to the right.

Herein, for example, if the first operation causes a displacement, a resource item displacement strategy that meets a current operation scenario is targetedly selected from a preset policy according to the displacement, so that a dynamic target object that can be rendered on the terminal user interface is obtained subsequently according to the original data and the resource item displacement strategy.

Step 204. Obtain at least two resource items of target object, and generate a dynamic rendering style of the target object according to the at least two resource items and the resource item displacement strategy.

Herein, after the interacted first operation is triggered, a terminal device targetedly selects, from the preset policy according to the displacement caused by the first operation, the resource item displacement strategy that meets a current operation scenario, so as to subsequently obtain, according to the original data and the resource item displacement strategy, the dynamic target object that can be rendered on the terminal user interface, to replace the target object in a static state before the first operation is triggered. First, a dynamic rendering style of the target object needs to be generated according to the original data and the resource item displacement strategy, and then the dynamic target object rendered on the terminal user interface is obtained based on the dynamic rendering style. Certainly, the dynamic rendering style of the target object may be generated at a terminal side or may be directly provided to the terminal device for use after being preprocessed at a server side. The original data may be multiple resource items of the target object obtained in advance, and the multiple resource items are a prerequisite for forming a multi-layer unsynchronized rendering manner.

Step 205. Switch to a second state when the target object is rendered according to the dynamic rendering style, the second state presenting a dynamic display effect that the target object follows the first operation on the terminal user interface in a multi-layer unsynchronized manner.

Herein, the first state (static) is that a user first sees a static picture. After the first operation is triggered, the static picture seen by the user may render a multi-layer unsynchronized stereoscopic effect, that is, change from the first state (static) to a second state (dynamic). Specifically, because the state change of this application from the static state to the dynamic state, is caused based on the displacement caused by the interacted first operation, the second state is used to represent that the target object follows the first operation to perform dynamic rendering on the terminal user interface in a multi-layer unsynchronized manner. The dynamic rendering is a multi-layer unsynchronized stereoscopic effect. Based on the first operation (such as gesture sliding or mouse scrolling, any operation that can cause a displacement of a target object on a page), an initially static picture in the browsing page obtains a dynamic picture rendering result in the browsing page, and the rendering effect is formed by reflecting a change on angle of view in a multi-layer manner to form a parallax.

By using this embodiment of the present disclosure, multiple resource items and a dynamic mechanism are used to obtain a multi-layer unsynchronized dynamic rendering effect. Specifically, the multiple resource items may be integrated according to a dynamic combination policy or algorithm. An example is: The composing prerequisite is performing composing according to a comparison between the center of a screen and the center of an advertising area (or referred to as the center of an area in which the target object resides). First, the terminal device senses the first operation that acts on the device, and renders a correspondingly generated dynamic picture to a user based on the foregoing composing prerequisite and a specific policy, to achieve a multi-layer unsynchronized stereoscopic effect of the picture. That is: 1) sense a user operation; and 2) generate and render a dynamic picture according to the user operation. The dynamic picture is generated according to multiple resource items and policies.

With the multiple resource items and the corresponding resource item displacement strategy, the dynamic rendering style of the target object that is rendered on the terminal may be obtained, and therefore, the basis of changing the target object from a static state to a dynamic state according to the first operation is included. Then, an interactive response is performed to respond to the first operation, to switch the target object to a second state when the target object is rendered according to the dynamic rendering style. The second state is used to represent that the target object follows the first operation to perform dynamic rendering on the terminal user interface in a multi-layer unsynchronized manner. A final information dynamic rendering form is obtained based on an interaction of an interactive operation, thereby promoting information sharing and spreading.

Figure 6:
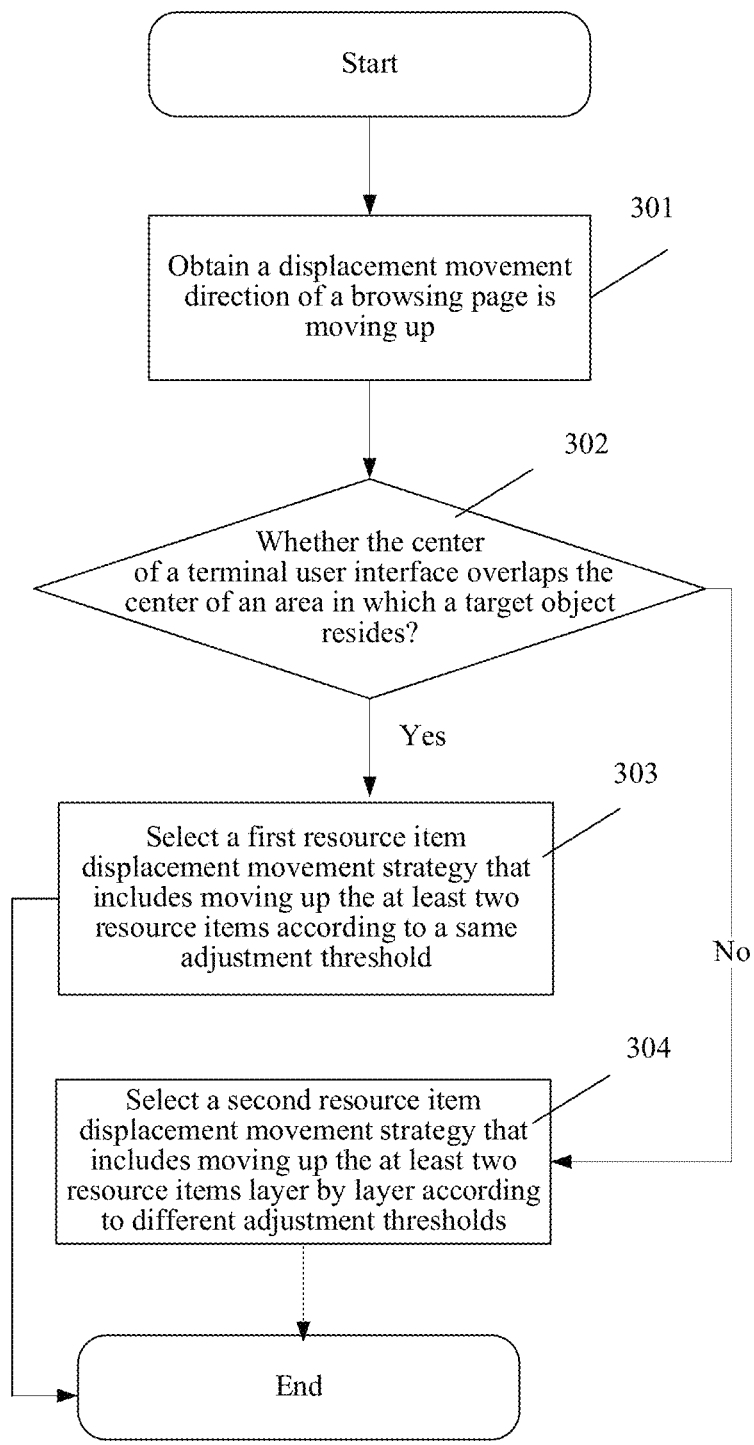
FIG. 6 is a schematic diagram of an interaction between a terminal and a server according to one embodiment of the present disclosure.

Based on the foregoing embodiments, in an information processing method of this embodiment of the present disclosure, a corresponding resource item displacement strategy and a specific integrated dynamic rendering effect selected according to different scenarios are shown in FIG. 6. The method includes:

Step 301. Determine, according to a parameter generated by the first operation, a movement direction of the browsing page.

Step 302. When selecting a resource item displacement strategy matched with the movement direction, if the movement direction is moving up, determine whether the center of the terminal user interface overlaps the center of an area in which the target object resides, and if the center of the terminal user interface overlaps the center of the area in which the target object resides, perform step 303; otherwise, perform step 304. Herein, the first operation is moving up, and the dynamic rendering effect is that the target object runs up. On the contrary, the first operation is moving down, and the dynamic rendering effect is that the target object runs down. It should be noted that, in addition to moving up and down, moving to the left and to the right or rendering a displacement with an angle is further included, and falls within the protection scope of the present disclosure. Correspondingly, a same adjustment threshold or adjustment thresholds at different levels is/are used to perform a corresponding resource item displacement strategy. Adjustment threshold, as used herein, may also be considered as adjustment value for a coordinate of a resource item layer. For example, if the first operation is moving to the left, when the center of the terminal user interface overlaps the center of the area in which the target object resides, the at least two resource items are entirely moved to the left according to a same adjustment threshold.

Step 303. Select, when the center of the terminal user interface overlaps the center of the area in which the target object resides, a first resource item displacement strategy that includes moving up the at least two resource items according to a same adjustment threshold.

Step 304. Select, when the center of the terminal user interface does not overlap the center of the area in which the target object resides, a second resource item displacement strategy that includes moving up the at least two resource items layer by layer according to different adjustment thresholds.

By using this embodiment of the present disclosure, when the center (screen display area) of the terminal user interface overlaps the center of the area in which the target object resides, a resource item displacement strategy on which the at least two resource items are directly overlaid and moved up entirely is selected simply. When the center (screen display area) of the terminal user interface does not overlap the center of the area in which the target object resides, based on different priorities of layers to which the at least two resource items belong, a resource item displacement strategy on which the at least two resource items are moved up layer by layer at different thresholds. For example, for a layer with a higher priority, during composing, the position of the layer is lower, and an adjustment threshold for a layer with a higher priority is larger; for a layer with a lower priority, during composing, the position of the layer is higher, and an adjustment threshold for a layer with a lower priority is lower or zero (that is, adjustment may not be performed on a layer with a lower priority). Certainly, not only adjustment is performed for displacements of layers according to different adjustment thresholds, but also adjustment may be performed for other display effects of layers such as transparency or colors according to different adjustment thresholds. An example is: Three resource items exist and are separately identified as resource item a1, resource item a2, and resource item a3. Resource item a1 is a layer with a highest priority, and resource item a3 is a layer with a lowest priority, so that during subsequent composing and overlapping, a sorting sequence of the resource items is: resource item a3, resource item a2, and resource item a1. That is, the layer "resource item a3" with the lowest priority is at a highest position during composing. In the selection of adjustment thresholds, resource item a1 is a maximum value, resource item a2 is secondary maximum value, and resource item a3 is a minimum value or zero (resource item a3 is not adjusted). It may be selected that an adjustment threshold of resource item a1 is 2 cm, an adjustment threshold of resource item a2 is 1 cm, and an adjustment threshold of resource item a3 is 0.5 cm or 0 cm. This is only a reference of an exemplary example herein, and is not limited to specific values. The at least two resource items are moved down layer by layer according to different adjustment thresholds corresponding to resource items a1 to a3.

In some embodiments, the resource item displacement strategy is selected based on the movement direction without considering whether the center of the terminal user interface does not overlap the center of the area in which the target object resides. The resource item displacement strategy is moving the at least two resource items layer by layer in a same direction as the movement direction of the user operation. The adjustment threshold/value corresponding to a specific layer is determined based on a difference value between the center of the terminal user interface and the center of the area in which the target object resides and a layer number. In one embodiment, layers of resource items may have preset initial relative positions in the target area (i.e., the area in which the target object resides). When the center of the terminal user interface overlaps the center of the target area, the resource items are placed based on their initial relative positions. As the center of the target area is moving further away from the center of the terminal user interface along with the user's sliding operation, relative positions of different layers of resource items also increase correspondingly. In one example, assuming initial relative position between neighboring layer a1 and layer a2 is 0 (i.e., centers of the two layers overlap), current relative position between the two layers when the target area is at any arbitrary position may be proportional (e.g., ratio p) to the distance (e.g., bv) between the arbitrary position and the center of the terminal user interface p*bv. In another example, if the initial relative position is $\Delta a$, the current relative position is $\Delta a+p*bv$. It can be understood that the center of the terminal user interface can be changed to other proper places on the terminal user interface in other embodiments.

Figure 7:
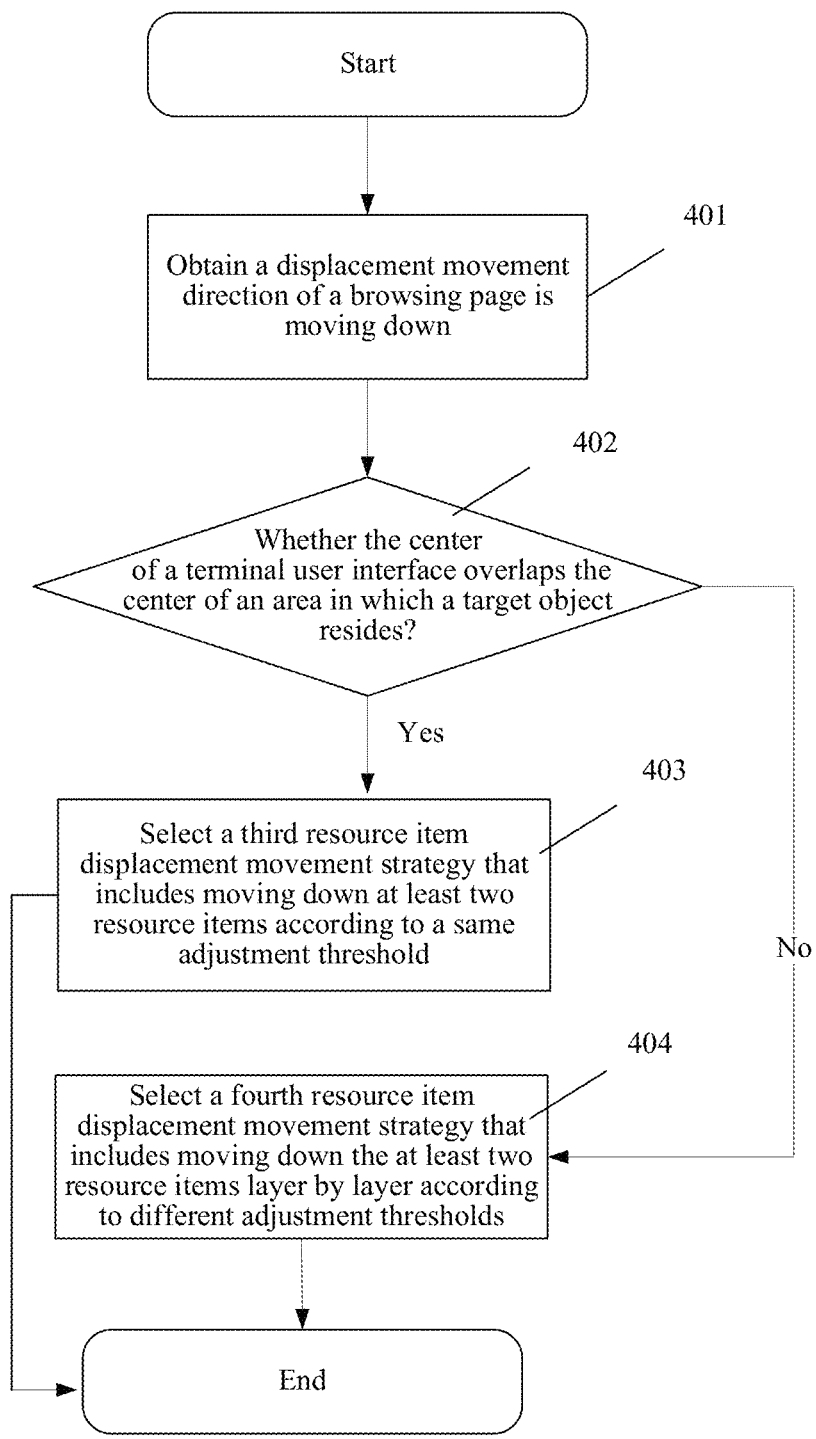
FIG. 7 is a schematic diagram of an interaction between a terminal and a server according to one embodiment of the present disclosure.

Based on the foregoing embodiments, in an information processing method of this embodiment of the present disclosure, a corresponding resource item displacement strategy and a specific integrated dynamic rendering effect selected according to different scenarios are shown in FIG. 7. The method includes:

Step 401. Determine, according to a parameter generated by the first operation, a movement direction of the browsing page.

Step 402. When selecting a resource item displacement strategy matched with the movement direction, if the movement direction is moving down, determine whether the center of the terminal user interface overlaps the center of an area in which the target object resides, and if the center of the terminal user interface overlaps the center of the area in which the target object resides, perform step 403; otherwise, perform step 404. Herein, the first operation is moving down, and the dynamic rendering effect is that the target object runs down. On the contrary, the first operation is moving up, and the dynamic rendering effect is that the target object runs up. It should be noted that, in addition to moving up and down, moving to the left and to the right or rendering a displacement with an angle is further included, and falls within the protection scope of the present disclosure. Correspondingly, a same adjustment threshold or adjustment thresholds at different levels is/are used to perform a corresponding resource item displacement strategy. For example, if the first operation is moving to the left, when the center of the terminal user interface overlaps the center of the area in which the target object resides, the at least two resource items are entirely moved to the left according to a same adjustment threshold.

Step 403. Select, when the center of the terminal user interface overlaps the center of the area in which the target object resides, a third resource item displacement strategy on which the at least two resource items are entirely moved down according to a same adjustment threshold.

Step 404. Select, when the center of the terminal user interface does not overlap the center of the area in which the target object resides, a fourth resource item displacement strategy on which the at least two resource items are moved down layer by layer according to different adjustment thresholds.

By using this embodiment of the present disclosure, when the center (screen display area) of the terminal user interface overlaps the center of the area in which the target object resides, a resource item displacement strategy on which the at least two resource items are directly overlaid and moved up entirely is selected simply. When the center (screen display area) of the terminal user interface does not overlap the center of the area in which the target object resides, based on different priorities of layers to which the at least two resource items belong, a resource item displacement strategy on which the at least two resource items are moved up layer by layer at different thresholds. For example, for a layer with a higher priority, during composing, the position of the layer is lower, and an adjustment threshold for a layer with a higher priority is larger; for a layer with a lower priority, during composing, the position of the layer is higher, and an adjustment threshold for a layer with a lower priority is lower or zero (that is, adjustment may not be performed on a layer with a lower priority). Certainly, not only adjustment is performed for displacements of layers according to different adjustment thresholds, but also adjustment may be performed for other display effects of layers such as transparency or colors according to different adjustment thresholds. An example is: Three resource items exist and are separately identified as resource item b1, resource item b2, and resource item b3. Resource item b1 is a layer with a highest priority, and resource item b3 is a layer with a lowest priority, so that during subsequent composing and overlapping, a sorting sequence of the resource items is: resource item b3, resource item b2, and resource item b1. That is, the layer "resource item b3" with the lowest priority is at a highest position during composing. In the selection of adjustment thresholds, resource item b1 is a maximum value, resource item b2 is secondary maximum value, and resource item b3 is a minimum value or zero (resource item b3 is not adjusted). It may be selected that an adjustment threshold of resource item b1 is 3 cm, an adjustment threshold of resource item b2 is 1.5 cm, and an adjustment threshold of resource item b3 is 1 cm or 0 cm. This is only a reference of an exemplary example herein, and is not limited to specific values. The at least two resource items are moved down layer by layer according to different adjustment thresholds corresponding to resource items b1 to b3.

In an implementation of this embodiment of the present disclosure, the generating a dynamic rendering style of the target object according to the at least two resource items and the resource item displacement strategy includes: sorting the at least two resource items according to a resource item priority, to obtain a sorting result; obtaining, when the center of the terminal user interface does not overlap the center of the area in which the target object resides, a first coordinate value used to identify the center of the terminal user interface, and obtaining a second coordinate value used to identify the center of the area in which the target object resides; and determining a difference between the first coordinate value and the second coordinate value as an adjustment base, and performing, according to the adjustment base, layer-by-layer coordinate value adjustment on the at least two resource items according to the sorting result, an adjustment threshold used in the layer-by-layer coordinate value adjustment being generated according to the adjustment base, and a same adjustment threshold or different adjustment thresholds being used for different layers to which the at least two resource items belongs. Forward/positive direction: an addition operation is performed on a displacement in a Y coordinate direction. Backward/negative direction: a subtraction operation is performed on a displacement in a Y coordinate direction. In an actual application, an upward displacement may bring a dynamic effect of the target object being up; and an upward displacement may also bring a dynamic effect of the target object being down. The different operational methods (forward or backward) are selected according to different dynamic effects.

In an implementation of this embodiment of the present disclosure, the method further includes:

1) Perform the layer-by-layer coordinate value adjustment with positive adjustment thresholds if the first coordinate value is greater than the second coordinate value, and the target object is located at an upper position of the terminal user interface. 2) Perform the layer-by-layer coordinate value adjustment with negative adjustment thresholds if the first coordinate value is less than the second coordinate value, and the target object is located at a lower position of the terminal user interface.

For the specific implementation of triggering the first operation in the browsing page in which the target object resides, matching a corresponding resource item displacement strategy from a preset policy according to a parameter generated by the first operation, and the various changes of obtaining at least two resource items of the target object in advance, and generating a dynamic rendering style of the target object according to the at least two resource items and the resource item displacement strategy, refer to the descriptions in the foregoing embodiments. In an implementation of this embodiment of the present disclosure, the method further includes: obtaining a preset new resource item (a pre-buried Easter egg), the new resource item being different from the at least two resource items of the target object obtained in advance; and generating the dynamic rendering style of the target object according to the new resource item, the at least two resource items, and the resource item displacement strategy, so that the target object follows the first operation to display or hide the new resource item on the terminal user interface.

To sum up the embodiments, according to a speed of the first operation, an acting pressure value or its change, an acting distance of the first operation, and the like, the target object follows the foregoing specific operation manners of the first operation to make rendering effects corresponding to the speed, the acting pressure, and the acting distance, that is, render an unsynchronized tracking movement reflection effect with the change brought by the first operation. Because the speed of the first operation, the acting pressure value or its change, the acting distance of the first operation, and the like are different in each operation of a user, the difference is precisely captured to improve the interaction precision and the interaction effect, to achieve a corresponding unsynchronized tracking movement reflection effect.

Figure 8:
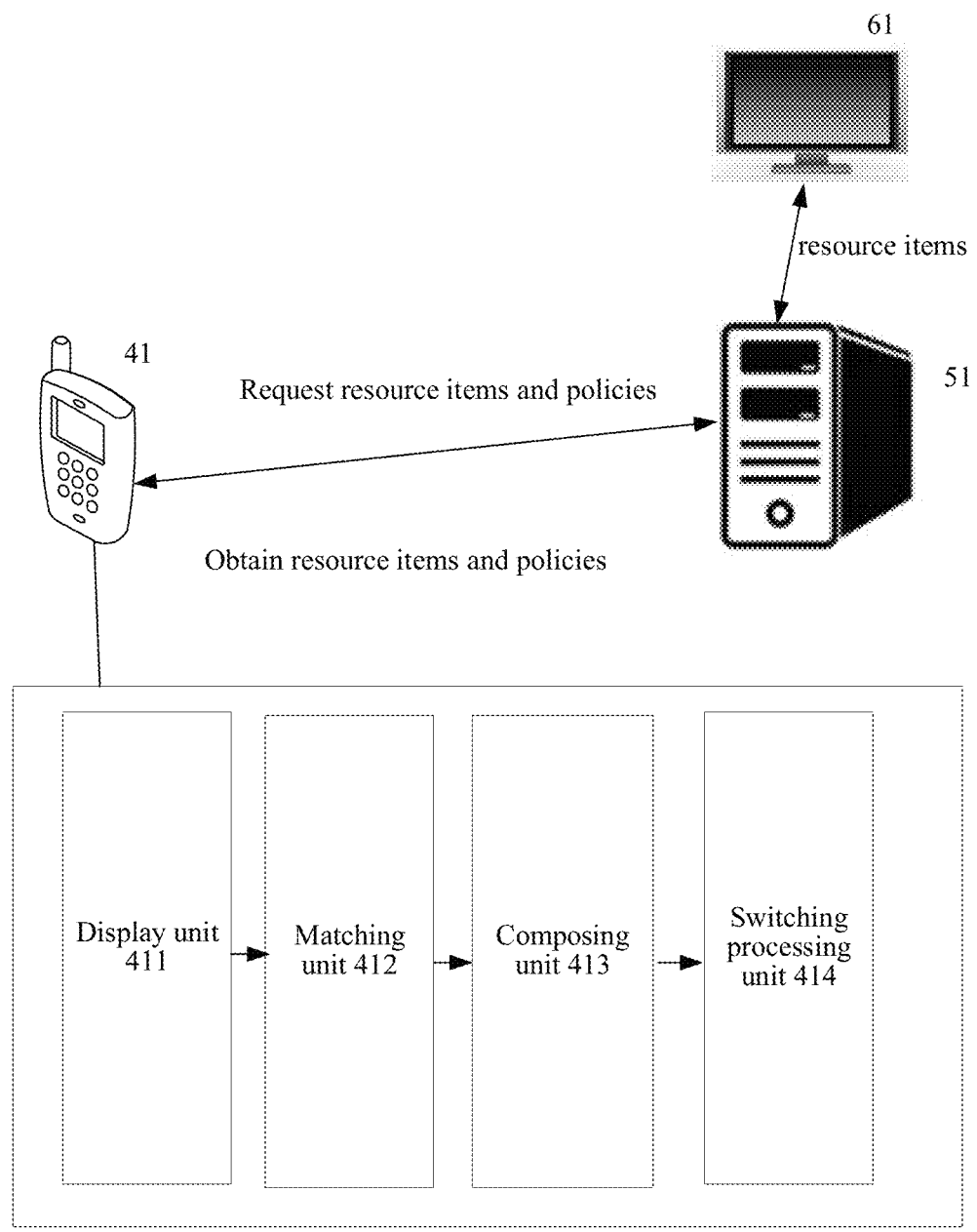
FIG. 8 is a schematic diagram of a system structure according to one embodiment of the present disclosure.

An information processing system of an embodiment of the present disclosure includes a terminal 41, a server 51, an advertiser terminal 61 that provides original data, and the like. As shown in FIG. 8, the terminal 41 includes: a display unit 411, configured to render a target object in a first state on a terminal user interface; a matching unit 412, configured to trigger a first operation in a browsing page in which the target object resides, determine, according to a parameter generated by the first operation, a movement direction of the browsing page, and select a resource item displacement strategy matched with the movement direction; a composing unit 413, configured to obtain at least two resource items of target object, and generate a dynamic rendering style of the target object according to the at least two resource items and the resource item displacement strategy; and a switching processing unit 414, configured to switch to a second state when the target object is rendered according to the dynamic rendering style, the second state presenting a dynamic display effect that the target object follows the first operation on the terminal user interface in a multi-layer unsynchronized manner.

Herein, the first state may be a static state, and exist as an initial state before the first operation is triggered. The first state (static) is that a user first sees a static picture. After the first operation is triggered, the static picture seen by the user may render a multi-layer unsynchronized stereoscopic effect, that is, change from the first state (static) to a second state (dynamic). That is, the initially static picture obtains a dynamic rendering result based on the first operation, and the rendering effect is formed by reflecting a change on angle of view in a multi-layer manner to form a parallax. The dynamic rendering includes: a change of a displacement, a change of a direction, a change of an angle, and the like. The dynamic rendering may further include: a transparent color, a semitransparent color, and a gradient of color brightness in a rendering state; or may be combined with the change of a displacement, the change of a direction, the change of an angle, and the like to render.

Herein, the first operation includes: a gesture sliding operation or a mouse scrolling operation. An example is: The first operation is triggered when the browsing page in which the target object resides is browsed, and the first operation may cause the browsing page (or the target object) to move up or move down. Certainly, it may also be the changes mentioned in the foregoing steps except the change of a displacement, such as the change of a direction and the change of an angle, and the transparent color, the semitransparent color, and the gradient of color brightness in a rendering state. The change of a displacement is not limited to moving up or down, and further include moving to the left or to the right. For example, if the first operation causes a displacement, a resource item displacement strategy that meets a current operation scenario is targetedly selected from a preset policy according to the displacement, so that a dynamic target object that can be rendered on the terminal user interface is obtained subsequently according to the original data and the resource item displacement strategy.

After the interacted first operation is triggered, a terminal device targetedly selects, from the preset policy according to the displacement caused by the first operation, the resource item displacement strategy on which meets a current operation scenario, so as to subsequently obtain, according to the original data and the resource item displacement strategy, the dynamic target object that can be rendered on the terminal user interface, to replace the target object in a static state before the first operation is triggered. First, a dynamic rendering style of the target object needs to be generated according to the original data and the resource item displacement strategy, and then the dynamic target object rendered on the terminal user interface is obtained based on the dynamic rendering style. Certainly, the dynamic rendering style of the target object may be generated at a terminal side or may be directly provided to the terminal device for use after being preprocessed at a server side. The original data may be multiple resource items of the target object obtained in advance, and the multiple resource items are a prerequisite for forming a multi-layer unsynchronized rendering manner.

By using this embodiment of the present disclosure, multiple resource items and a dynamic mechanism are used to obtain a multi-layer unsynchronized dynamic rendering effect. Specifically, the multiple resource items may be integrated according to a dynamic combination policy or algorithm. First, the user sees a static picture, that is, the target object is a first state (static). After the first operation is triggered, the static picture seen by the user may render a multi-layer unsynchronized stereoscopic effect, that is, change from the first state (static) to a second state (dynamic). Specifically, because the state change of this application from the static state to the dynamic state is caused based on the displacement caused by the interacted first operation, the second state is used to represent that the target object follows the first operation to perform dynamic rendering on the terminal user interface in a multi-layer unsynchronized manner. The dynamic rendering is a multi-layer unsynchronized stereoscopic effect. Based on the first operation (such as gesture sliding or mouse scrolling, any operation that can cause a displacement of a target object on a page), an initially static picture in the browsing page obtains a dynamic picture rendering result in the browsing page, and the rendering effect is formed by reflecting a change on angle of view in a multi-layer manner to form a parallax.

An example is: The composing prerequisite is performing composing according to a comparison between the center of a screen and the center of an advertising area (or referred to as the center of an area in which the target object resides). First, the terminal device senses the first operation that acts on the device, and renders a correspondingly generated dynamic picture to a user based on the foregoing composing prerequisite and a specific policy, to achieve a multi-layer unsynchronized stereoscopic effect of the picture. That is: 1) sense a user operation; and 2) generate and render a dynamic picture according to the user operation. The dynamic picture is generated according to multiple resource items and policies.

With the multiple resource items and the corresponding resource item displacement strategy, the dynamic rendering style of the target object that is rendered on the terminal may be obtained, and therefore, the basis of changing the target object from a static state to a dynamic state according to the first operation is included. Then, an interactive response is performed to respond to the first operation, to switch the target object to a second state when the target object is rendered according to the dynamic rendering style. The second state is used to represent that the target object follows the first operation to perform dynamic rendering on the terminal user interface in a multi-layer unsynchronized manner. A final information dynamic rendering form is obtained based on an interaction of an interactive operation, thereby promoting information sharing and spreading.

In an implementation of this embodiment of the present disclosure, the matching unit further includes: a displacement determining subunit, configured to determine, according to the parameter generated by the first operation, a movement direction of the browsing page; and a selection subunit, configured to match a corresponding resource item displacement strategy from a preset policy according to the movement direction.

In an implementation of this embodiment of the present disclosure, the first operation includes: a gesture sliding operation or a mouse scrolling operation.

In an implementation of an embodiment of the present disclosure, the displacement determining subunit is further configured to: determine, when the movement direction is moving up, whether the center of the terminal user interface overlaps the center of an area in which the target object resides; and the selection subunit is further configured to: select, when the center of the terminal user interface overlaps the center of the area in which the target object resides, a first resource item displacement strategy on which the at least two resource items are entirely moved up according to a same adjustment threshold; and select, when the center of the terminal user interface does not overlap the center of the area in which the target object resides, a second resource item displacement strategy on which the at least two resource items are moved up layer by layer according to different adjustment thresholds.

In an implementation of this embodiment of the present disclosure, the displacement determining subunit is further configured to: determine, when the movement direction is moving down, whether the center of the terminal user interface overlaps the center of an area in which the target object resides; and the selection subunit is further configured to: select, when the center of the terminal user interface overlaps the center of the area in which the target object resides, a third resource item displacement strategy on which the at least two resource items are entirely moved down according to a same adjustment threshold; and select, when the center of the terminal user interface does not overlap the center of the area in which the target object resides, a fourth resource item displacement strategy on which the at least two resource items are moved down layer by layer according to different adjustment thresholds.

In an implementation of this embodiment of the present disclosure, the composing unit is further configured to: sort the at least two resource items according to a resource item priority, to obtain a sorting result; obtain, when the center of the terminal user interface does not overlap the center of the area in which the target object resides, a first coordinate value used to identify the center of the terminal user interface, and obtain a second coordinate value used to identify the center of the area in which the target object resides; and determine a difference between the first coordinate value and the second coordinate value as an adjustment base, and perform, according to the adjustment base, layer-by-layer coordinate value adjustment on the at least two resource items according to the sorting result, an adjustment threshold used in the layer-by-layer coordinate value adjustment being generated according to the adjustment base, and a same adjustment threshold or different adjustment thresholds being used for different layers to which the at least two resource items belongs.

In an implementation of this embodiment of the present disclosure, the composing unit is further configured to perform the layer-by-layer coordinate value adjustment with positive adjustment thresholds if the first coordinate value is greater than the second coordinate value, and the target object is located at an upper position of the terminal user interface; and perform the layer-by-layer coordinate value adjustment with negative adjustment thresholds if the first coordinate value is less than the second coordinate value, and the target object is located at a lower position of the terminal user interface.

In an implementation of this embodiment of the present disclosure, the terminal further includes: a new resource item obtaining unit, configured to obtain a preset new resource item, the new resource item being different from the at least two resource items of the target object obtained in advance; and the composing unit is further configured to generate the dynamic rendering style of the target object according to the new resource item, the at least two resource items, and the resource item displacement strategy, so that the target object follows the first operation to display or hide the new resource item on the terminal user interface.

For the processor used for processing data, processing may be performed by using a microprocessor, a central processing unit (CPU), a digital signal processor (DSP), or a field-programmable gate array (FPGA). The storage medium includes an operation instruction, the operation instruction may be computer executable code, and the operation instruction is used to implement the foregoing steps in the process of the information processing method in the embodiments of the present disclosure.

Herein, it should be noted that, the foregoing descriptions about the terminal and the server are similar to the descriptions in the foregoing method, and the beneficial effect of the method is not described herein again. For technical details that are not disclosed in the terminal and server embodiments of the present disclosure, refer to the description content of the method processes described in the embodiments of the present disclosure.

A real application scenario is used as an example to describe the embodiments of the present disclosure as follows:

At present, in an information interaction process, the rendering form of most information is only changing information types and forms, and information sharing, spreading, and interactivity are not concerned enough. The information may be advertising information, or may be other multimedia information. Corresponding to this scenario, by using the embodiments of the present disclosure, the information (advertising information) may be switched from an original static picture form to a three-dimensional rendering form. The switching is triggered based on an interaction operation of a user on a page, such as a sliding moving operation or a mouse moving operation, to reflect a change on angle of view on the original static advertising picture in a multi-layer manner to form a parallax.

A processing process using this embodiment of the present disclosure includes: 1) output an advertising resource item in a multi-layer element separation manner; 2) upload the advertising resource item to a server end, for background code to perform dynamic combination; 3) put an advertising picture to a mobile end or a computer end for page display; 4) when a user browses a page by performing a gesture up and down sliding operation or a mouse scrolling operation; 5) the area of the advertising picture follows the speed and distance of the operation to reflect an unsynchronized track movement; and 6) the advertising picture seen by the user renders a change effect of a three-dimensional parallax. A display page of information (such as advertising information) is rendered on a terminal. First, a resource item picture stored by layers in the server end is loaded, and added to queue a; a Y coordinate of a page in the middle of a screen display area is obtained and value b is assigned to the Y coordinate, a Y coordinate of a page in the position of the center of an advertising picture is obtained and value c is assigned to the Y coordinate, and value b and value c are compared. If b is greater than c, it indicates that the advertising picture is in an upper position of the display screen; if b is less than c, it indicates that the advertising picture is in a lower position of the display screen; and if b is equal to c, it indicates that the advertising picture is in the middle of the screen. Values are obtained from queue a circularly according to the difference between b and c, to piece an advertising picture, where the piecing manner is performing, by using the difference between b and c as the base, forward or backward layer-by-layer Y coordinate adjustment for resource items in queue a separately, and a larger difference indicates a larger layer-by-layer displacement distance. When the user slides or scrolls a page to browse, value b changes, and the foregoing calculation manner is repeated.

Figure 9:
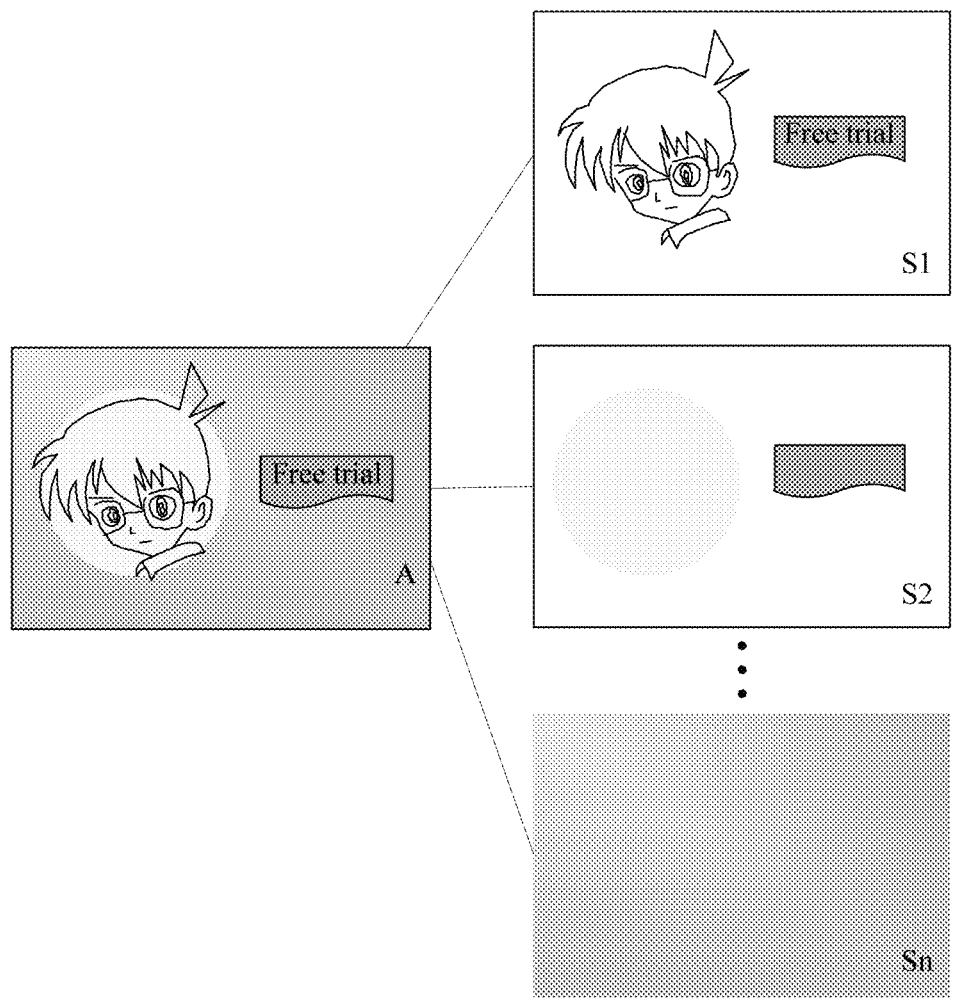
FIG. 9 to FIG. 17 are rendering effect pictures obtained by combining layers of resource items and responding to corresponding user operations in multiple application scenarios according to the embodiments of the present disclosure.
Figure 11:
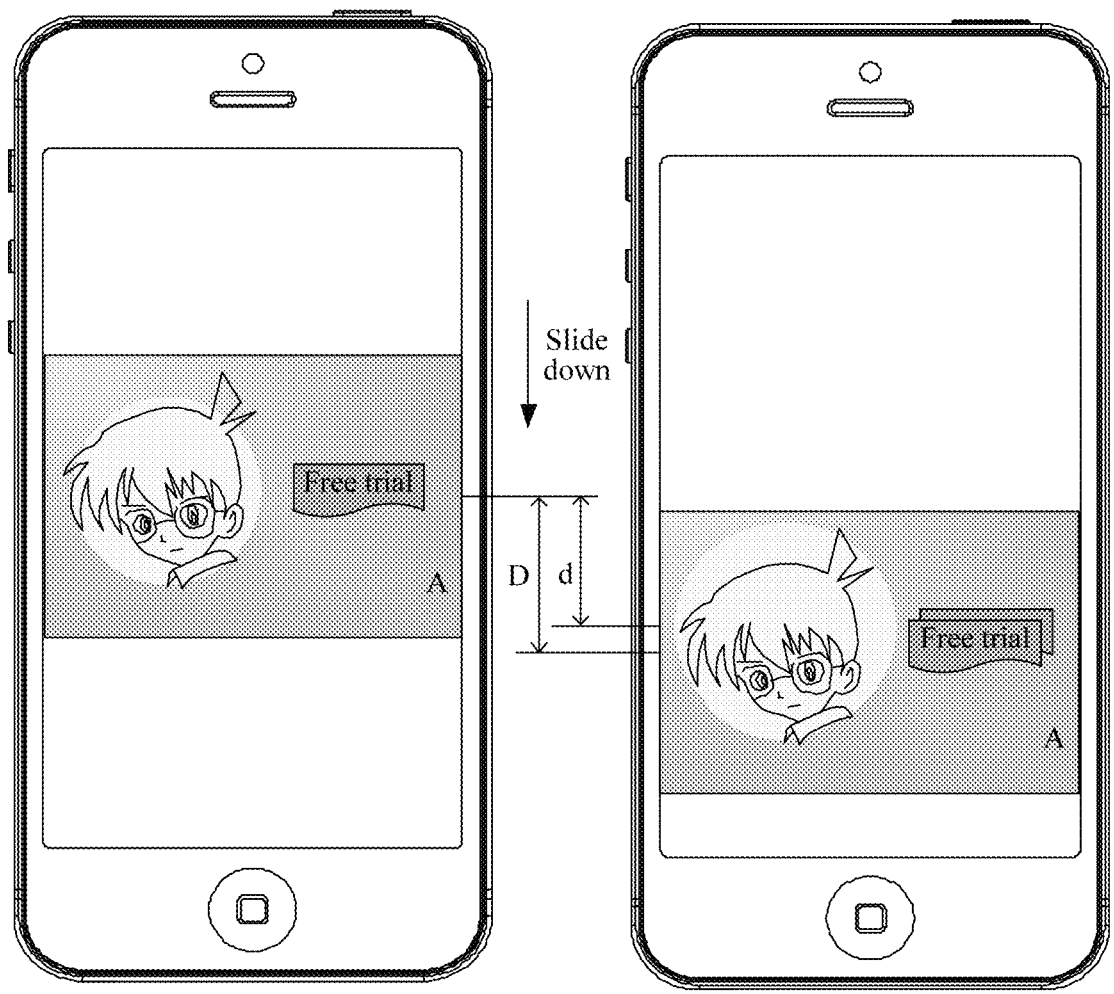
Figure 12:
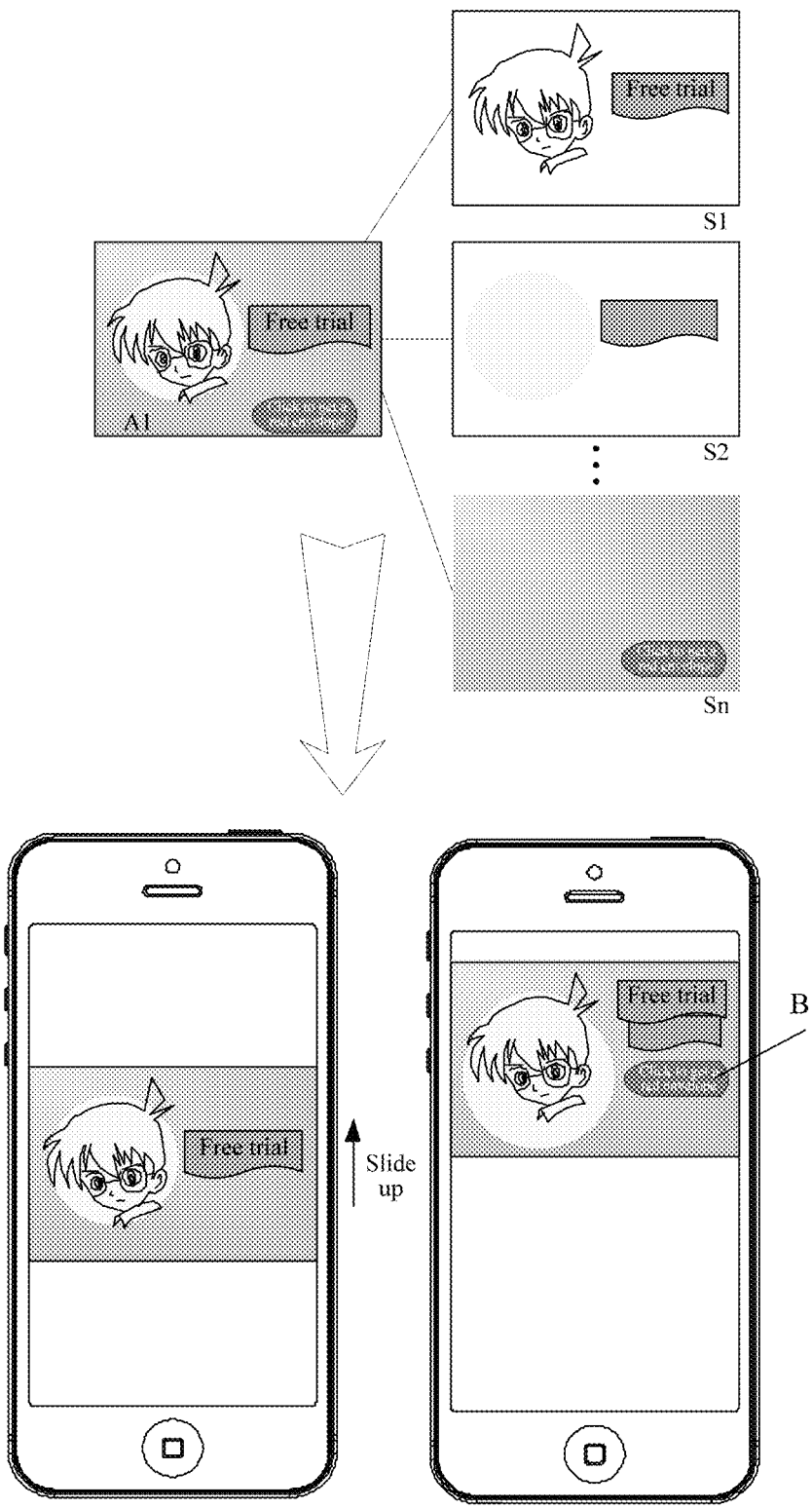
Figure 13:
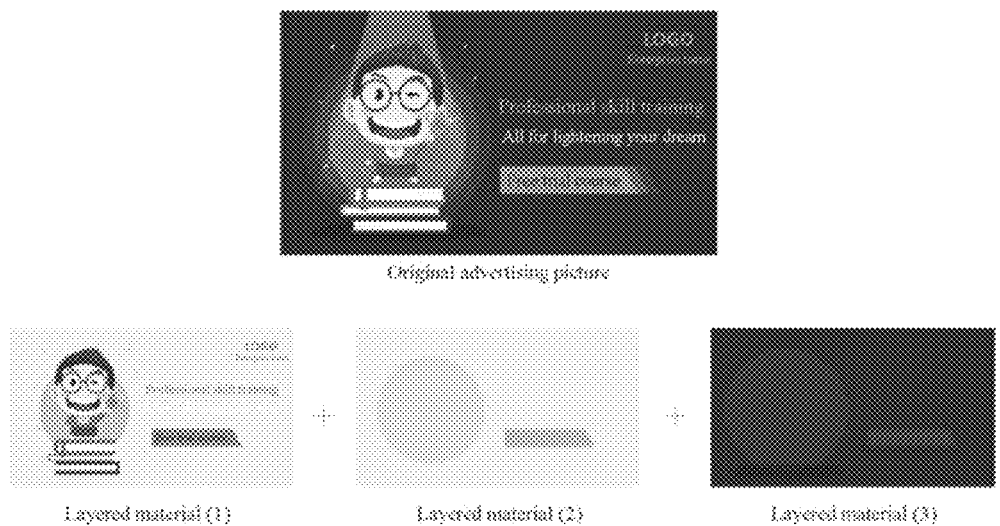

FIG. 9 to FIG. 17 are final rendering effect pictures obtained in the foregoing scenarios by using the embodiments of the present disclosure. Specifically, FIG. 9 includes: a target object in a first state, such as an original static picture identified by A, and the static picture is initially displayed on a terminal user interface, and rendered to a user. FIG. 9 further includes multiple resource items (separately identified by S1, S2, . . . , Sn) of the target object (the original static picture identified by A) obtained in advance, so as to generate a dynamic rendering style of the target object subsequently according to the multiple resource items and the resource item displacement strategy. Another schematic diagram in which individual layers of the target object are shown in FIG. 13.

Figure 10:
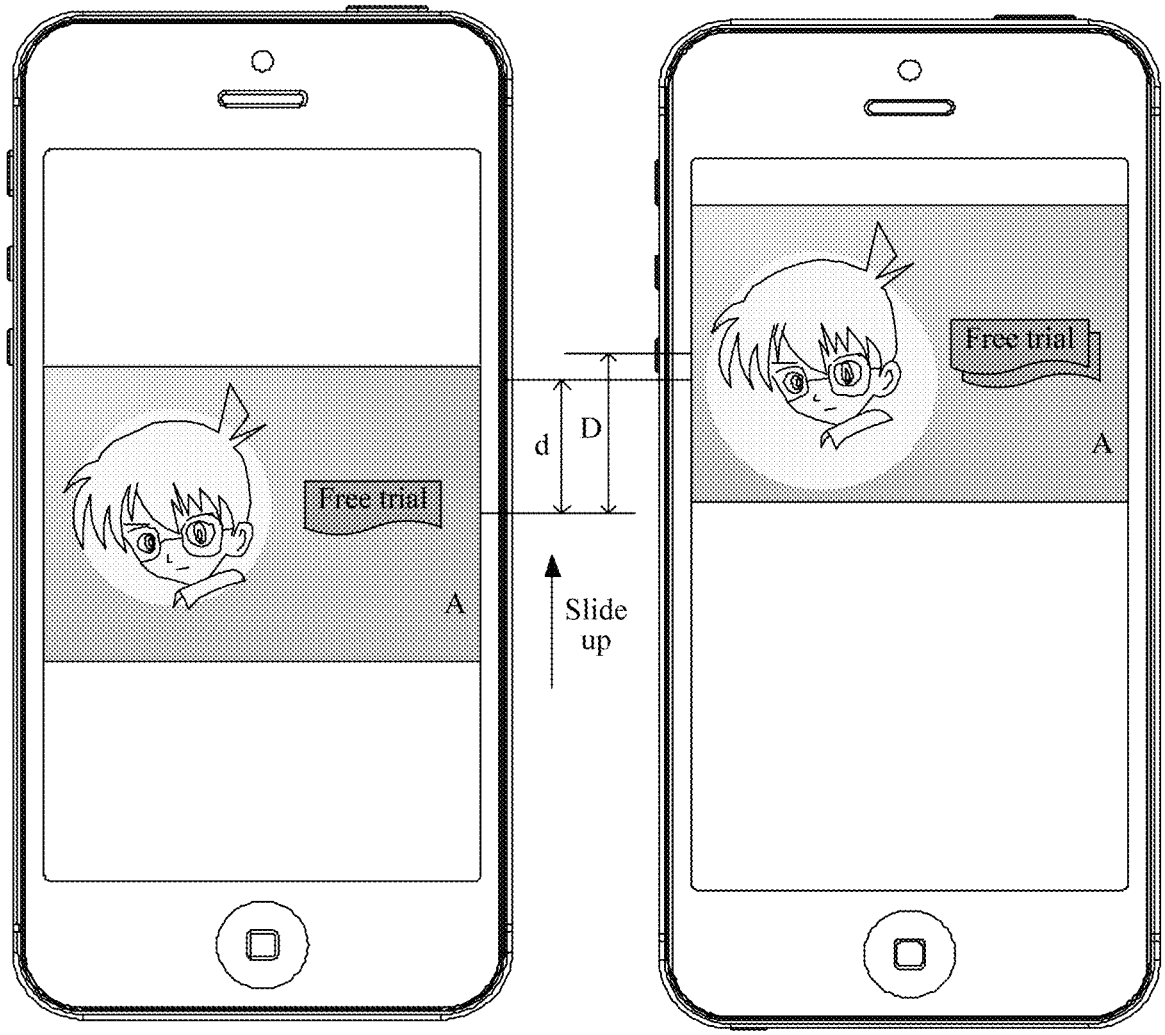
Figure 14:
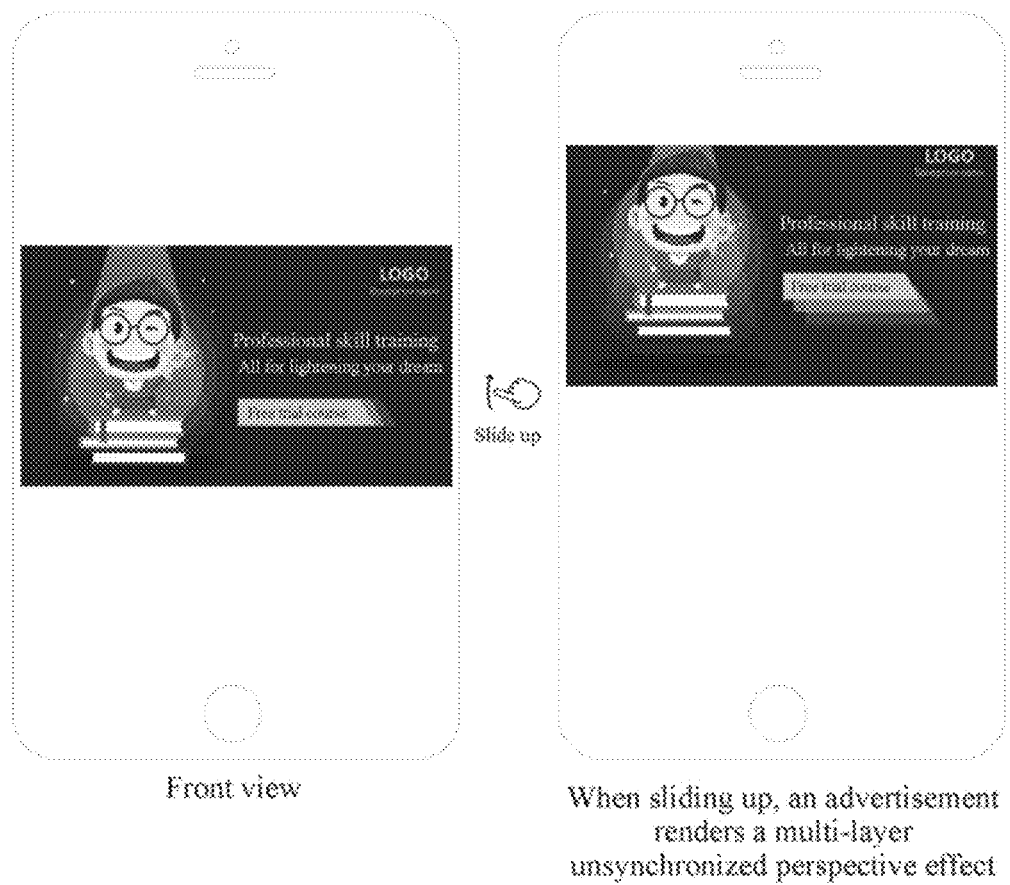

It should be noted that, after the interacted first operation is triggered, the terminal device targetedly selects, from the preset policy according to a displacement caused by the first operation, a resource item displacement strategy that meets a current operation scenario, so as to generate a dynamic rendering style of the target object subsequently according to the multiple resource items and the resource item displacement strategy, and obtain a dynamic target object that can be rendered on the terminal user interface, as shown in FIG. 10 to FIG. 11, to replace the target object in a static state (the original static picture identified by A) before the first operation is triggered. First, a dynamic rendering style of the target object needs to be generated according to the original data and the resource item displacement strategy, and then the dynamic target object rendered on the terminal user interface is obtained based on the dynamic rendering style. Certainly, the dynamic rendering style of the target object may be generated at a terminal side or may be directly provided to the terminal device for use after being preprocessed at a server side. The original data may be multiple resource items of the target object obtained in advance, and the multiple resource items are a prerequisite for forming a multi-layer unsynchronized rendering manner. For FIG. 10, the first operation is a finger up sliding operation on the browsing page. If D>d, trigger the finger up sliding operation to switch from the left first state to the right second state, so that the target object displays a dynamic rendering style. That is, the target object follows the finger up sliding operation to move up on the terminal user interface in a multi-layer unsynchronized manner. Another state switching diagram caused when a finger up sliding operation is triggered is shown in FIG. 14.

Figure 15:

For FIG. 11, the first operation is a finger up sliding operation on the browsing page. If D>d, trigger a finger down sliding operation to switch from the left first state to the right second state, so that the target object displays a dynamic rendering style. That is, the target object follows the finger down sliding operation to move up on the terminal user interface in a multi-layer unsynchronized manner. Another state switching diagram caused when a finger down sliding operation is triggered is shown in FIG. 15.

Figure 16:
Figure 16:
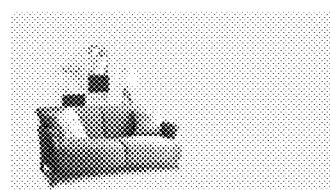
Figure 16:
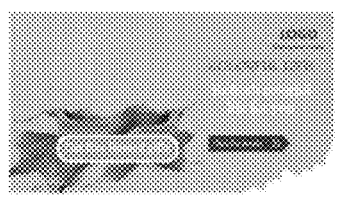

FIG. 12 includes: a target object in a first state, such as an original static picture identified by A1, and the static picture is initially displayed on a terminal user interface, and rendered to a user. FIG. 12 further includes multiple resource items (separately identified by S1, S2, . . . , Sn, and S2 further includes a pre-buried Easter egg "Click to get a red envelope") of the target object (the original static picture identified by A1) obtained in advance, so as to generate a dynamic rendering style of the target object subsequently according to the multiple resource items and the resource item displacement strategy. The first operation is a finger up sliding operation in a browsing page. FIG. 12 further includes a situation in which the first state switches to a second state after the finger up sliding operation is triggered. The finger up sliding operation is triggered to switch from the left first state to the right second state, so that the target object displays a dynamic rendering style. That is, the target object follows the finger up sliding operation to move up on the terminal user interface in a multi-layer unsynchronized manner. The moving up exposes the originally hidden pre-buried Easter egg, the information "Click to get a red envelope" identified by B. In addition, if the finger down sliding operation is triggered, the Easter egg that has been displayed to the user is hidden by the information "Click to get the red envelope" identified by B. Another schematic diagram in which individual layers of the target object are shown in FIG. 16, and the pre-buried Easter egg is information "Get free limited gifts" displayed by a layered resource item (2). Triggering the finger up sliding operation may switch a state, and display the hidden pre-buried "Get free limited gifts", as shown in FIG. 17.

The dynamic rendering is a multi-layer unsynchronized stereoscopic effect. Based on the first operation (such as gesture sliding or mouse scrolling, any operation that can cause a displacement of a target object on a page), an initially static picture in the browsing page obtains a dynamic picture rendering result in the browsing page, and the rendering effect is formed by reflecting a change on angle of view in a multi-layer manner to form a parallax.

Figure 17:
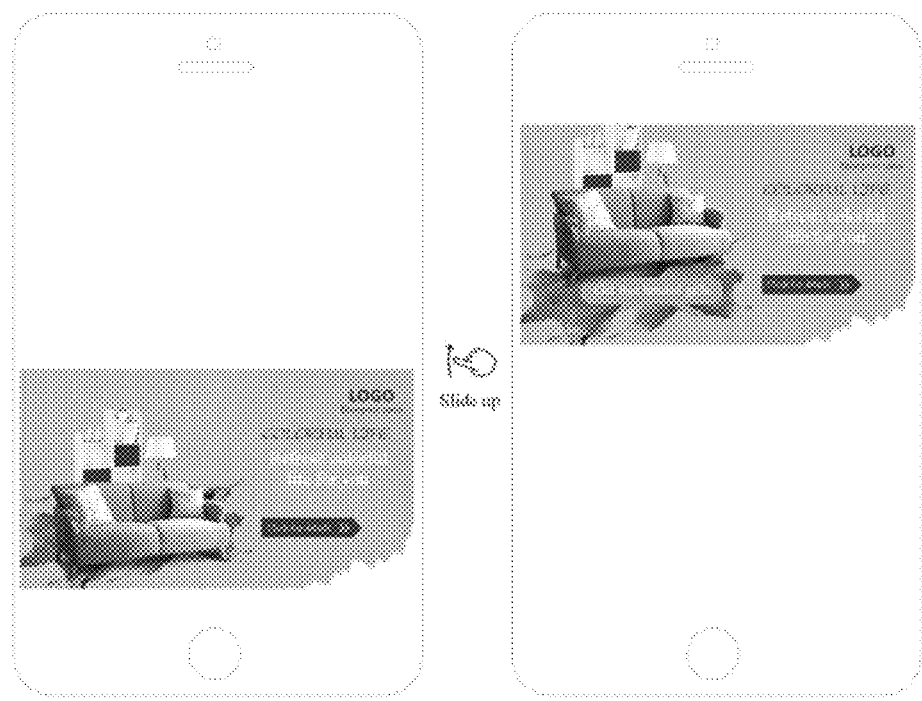

It should be noted that, for various interactive controls in the accompanying drawings of this specification, such as "Free trial courses" in FIG. 14, and "Get free limited gifts" in FIG. 17, after a currently displayed picture is triggered from "static" to "dynamic" based on an interaction between a user and a terminal (such as the first operation) to switch a state, to obtain a dynamic image rendering effect in the browsing page in a multi-layer manner, when the execution of the first operation ends, the dynamic image rendering effect changes to a static image. In this case, the user may click the interactive control to enter an interaction between the terminal and the background server, to obtain a new browsing page that the interactive control points to. Certainly, the user may also click the entire image, to enter the interaction between the terminal and the background server, to obtain the new browsing page that the interactive control points to. This specification does not limit the specific interaction manner. After the dynamic image rendering effect is obtained, the image changes to the static image again, and the position of the image in the screen (such as position C2) is different from the position of the image in a static state before the state is switched (such as position C1). For example, position C1 is the position in the center of the screen, and when the finger of the user slides up to cause a dynamic rendering effect, and move the entire image up, and when the image returns to the static image, position C2 is the position moving up in the screen.

An embodiment of the present disclosure further provides a computer storage medium, for example, a memory including a computer program. The computer program may be executed by a processor of a data processing apparatus, to complete the steps of the foregoing method. The computer storage medium may be a memory such as a FRAM, a ROM, a PROM, an EPROM, an EEPROM, a Flash Memory, a magnetic surface memory, an optical disc, or a CD-ROM; or may be various devices including one or any combination of the foregoing memories, such as a mobile phone, a computer, a tablet device, or a personal digital assistant.

A computer readable storage medium provided in this embodiment of the present disclosure stores a computer program, and when being run by a processor, the computer program performs the following steps of the information processing method.

In an embodiment, when being run by the processor, the computer program performs:
rendering a target object in a first state on a terminal user interface;
triggering a first operation in a browsing page in which the target object resides, determining, according to a parameter generated by the first operation, a movement direction of the browsing page, and selecting a resource item displacement strategy matched with the movement direction;
obtaining at least two resource items of target object, and generating a dynamic rendering style of the target object according to the at least two resource items and the resource item displacement strategy; and
switching to a second state when the target object is rendered according to the dynamic rendering style, the second state presenting a dynamic display effect that the target object follows the first operation on the terminal user interface in a multi-layer unsynchronized manner.

In an embodiment, when being run by the processor, the computer program further performs:
determining, when the movement direction is moving up, whether the center of the terminal user interface overlaps the center of an area in which the target object resides;
selecting, when the center of the terminal user interface overlaps the center of the area in which the target object resides, a first resource item displacement strategy on which the at least two resource items are entirely moved up according to a same adjustment threshold; and
selecting, when the center of the terminal user interface does not overlap the center of the area in which the target object resides, a second resource item displacement strategy on which the at least two resource items are moved up layer by layer according to different adjustment thresholds.

In an embodiment, when being run by the processor, the computer program further performs:
determining, when the movement direction is moving down, whether the center of the terminal user interface overlaps the center of an area in which the target object resides; and
selecting, when the center of the terminal user interface overlaps the center of the area in which the target object resides, a third resource item displacement strategy on which the at least two resource items are entirely moved down according to a same adjustment threshold; and
selecting, when the center of the terminal user interface does not overlap the center of the area in which the target object resides, a fourth resource item displacement strategy on which the at least two resource items are moved down layer by layer according to different adjustment thresholds.

In an embodiment, when being run by the processor, the computer program further performs:
sorting the at least two resource items according to a resource item priority, to obtain a sorting result;
obtaining, when the center of the terminal user interface does not overlap the center of the area in which the target object resides, a first coordinate value used to identify the center of the terminal user interface, and obtain a second coordinate value used to identify the center of the area in which the target object resides; and
determining a difference between the first coordinate value and the second coordinate value as an adjustment base, and perform, according to the adjustment base, layer-by-layer coordinate value adjustment on the at least two resource items according to the sorting result, an adjustment threshold used in the layer-by-layer coordinate value adjustment being generated according to the adjustment base, and a same adjustment threshold or different adjustment thresholds being used for different layers to which the at least two resource items belongs.

In an embodiment, when being run by the processor, the computer program further performs:
performing the layer-by-layer coordinate value adjustment with positive adjustment thresholds if the first coordinate value is greater than the second coordinate value, and the target object is located at an upper position of the terminal user interface; and
performing the layer-by-layer coordinate value adjustment with negative adjustment thresholds if the first coordinate value is less than the second coordinate value, and the target object is located at a lower position of the terminal user interface.

In an embodiment, when being run by the processor, the computer program further performs:
obtaining a preset new resource item, the new resource item being different from the at least two resource items of target object; and
generating the dynamic rendering style of the target object according to the new resource item, the at least two resource items, and the resource item displacement strategy, so that the target object follows the first operation to display or hide the new resource item on the terminal user interface.

By using the embodiments of the present disclosure, a target object in a first state (static) is rendered on a terminal user interface; a first operation is triggered in a browsing page in which the target object resides, a movement direction of the browsing page is determined according to a parameter generated by the first operation, and a resource item displacement strategy matched with the movement direction is selected; and at least two resource items of target object are obtained, and a dynamic rendering style of the target object is generated according to the at least two resource items and the resource item displacement strategy. With the multiple resource items and the corresponding resource item displacement strategy, the dynamic rendering style of the target object that is rendered on the terminal may be obtained, and therefore, the basis of changing the target object from a static state to a dynamic state according to the first operation is included. Then, an interactive response is performed to respond to the first operation, to switch the target object to a second state when the target object is rendered according to the dynamic rendering style. The second state is used to represent that the target object follows the first operation to perform dynamic rendering on the terminal user interface in a multi-layer unsynchronized manner. A final information dynamic rendering form is obtained based on an interaction of an interactive operation, thereby promoting information sharing and spreading.

In the several embodiments provided in this application, it should be understood that the disclosed device and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units need to be selected according to actual requirements to implement the purpose of the solution of the embodiments.

In addition, the functional units in the embodiments of the present disclosure may all be integrated into one processing unit, or each of the units may independently serve as one unit, or two or more units may be integrated into one unit. The integrated unit may be implemented in the form of hardware, or may be implemented in the form of a hardware plus software functional unit.

A person of ordinary skill in the art may understand that, some or all of steps for implementing the method embodiments may be implemented by using hardware related to a program instruction. The program may be stored in a computer readable storage medium. When the program is executed, the steps including the method embodiments are performed. However, the storage medium includes various types of media that may store program code, for example, a mobile storage device, a ROM, a RAM, a magnetic disk, or an optical disc.

Alternatively, when the integrated units are implemented in a form of a software functional unit and sold or used as an independent product, the modules may be stored in a computer-readable storage medium. Based on such an understanding, the technical solutions of the embodiments of the present disclosure essentially or the part contributing to the existing technology may be implemented in a form of a software product. The computer software product is stored in a storage medium, and includes several instructions for instructing a computer device (which may be a personal computer, a server, a network device, or the like) to perform all or some of the methods in the embodiments of the present disclosure. The storage medium includes various media that may store processing code, such as a removable storage device, a ROM, a RAM, a magnetic disk, and an optical disc.

The foregoing descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the appended claims.

By using the embodiments of the present disclosure, a target object in a first state (static) is rendered on a terminal user interface; a first operation is triggered in a browsing page in which the target object resides, a movement direction of the browsing page is determined according to a parameter generated by the first operation, and a resource item displacement strategy matched with the movement direction is selected; and at least two resource items of target object are obtained, and a dynamic rendering style of the target object is generated according to the at least two resource items and the resource item displacement strategy. With the multiple resource items and the corresponding resource item displacement strategy, the dynamic rendering style of the target object that is rendered on the terminal may be obtained, and therefore, the basis of changing the target object from a static state to a dynamic state according to the first operation is included. Then, an interactive response is performed to respond to the first operation, to switch the target object to a second state when the target object is rendered according to the dynamic rendering style. The second state is used to represent that the target object follows the first operation to perform dynamic rendering on the terminal user interface in a multi-layer unsynchronized manner. A final information dynamic rendering form is obtained based on an interaction of an interactive operation, thereby promoting information sharing and spreading.

What is claimed is:

1. An information processing method for a computing terminal, comprising:
    rendering a target object in a first state on a terminal user interface;
    detecting a first operation triggered in a browsing page in which the target object resides;
    determining, according to a parameter generated by the first operation, a movement direction of the browsing page;
    determining whether a center of the terminal user interface overlaps a center of an area in which the target object resides;
    determining, when the center of the terminal user interface overlaps the center of the area, that a resource item displacement strategy includes moving the at least two resource items toward a direction matching the movement direction according to a same adjustment threshold;
    determining, when the center of the terminal user interface does not overlap the center of the area, that the resource item displacement strategy includes moving the at least two resource items toward a direction matching the movement direction layer by layer according to different adjustment thresholds;
    obtaining at least two resource items of the target object, each resource item being placed on one layer among multiple layers of the target object;
    generating a dynamic rendering style of the target object according to the at least two resource items and the resource item displacement strategy; and
    switching to render the target object in a second state according to the dynamic rendering style, the second state presenting a dynamic display effect that the target object follows the first operation on the terminal user interface in a multi-layer unsynchronized manner.

2. The method according to claim 1, wherein the generating a dynamic rendering style of the target object according to the at least two resource items and the resource item displacement strategy comprises:
   sorting the at least two resource items according to corresponding resource item priorities, to obtain a sorting result;
   obtaining, when the center of the terminal user interface does not overlap the center of the area in which the target object resides, a first coordinate value used to identify the center of the terminal user interface, and a second coordinate value used to identify the center of the area in which the target object resides;
   determining a difference between the first coordinate value and the second coordinate value as an adjustment base; and
   performing, according to the adjustment base, layer-by-layer coordinate value adjustment on the at least two resource items according to the sorting result, an adjustment threshold used in the layer-by-layer coordinate value adjustment being generated according to the adjustment base, and different adjustment thresholds being used for different layers to which the at least two resource items belongs.

3. The method according to claim 2, wherein the method further comprises:
   performing the layer-by-layer coordinate value adjustment with positive adjustment thresholds if the first coordinate value is greater than the second coordinate value; and
   performing the layer-by-layer coordinate value adjustment with negative adjustment thresholds if the first coordinate value is less than the second coordinate value.

4. The method according to claim 1, wherein the method further comprises:
   obtaining a preset new resource item, the new resource item being different from the at least two resource items of the target object; and
   generating the dynamic rendering style of the target object according to the new resource item, the at least two resource items, and the resource item displacement strategy, the dynamic rendering style presenting a dynamic display effect that the target object follows the first operation to display or hide the new resource item on the terminal user interface.

5. A terminal, comprising:
   a memory; and
   a processor coupled to the memory and configured to perform:
   rendering a target object in a first state on a terminal user interface;
   detecting a first operation triggered in a browsing page in which the target object resides;
   determining, according to a parameter generated by the first operation, a movement direction of the browsing page;
   determining whether a center of the terminal user interface overlaps a center of an area in which the target object resides;
   determining, when the center of the terminal user interface overlaps the center of the area, that a resource item displacement strategy includes moving the at least two resource items toward a direction matching the movement direction according to a same adjustment threshold;
   determining, when the center of the terminal user interface does not overlap the center of the area, that the resource item displacement strategy includes moving the at least two resource items toward a direction matching the movement direction layer by layer according to different adjustment thresholds;
   obtaining at least two resource items of the target object, each resource item being placed on one layer among multiple layers of the target object;
   generating a dynamic rendering style of the target object according to the at least two resource items and the resource item displacement strategy; and
   switching to render the target object in a second state according to the dynamic rendering style, the second state presenting a dynamic display effect that the target object follows the first operation on the terminal user interface in a multi-layer unsynchronized manner.

6. The terminal according to claim 5, wherein the processor is further configured to perform:
   sorting the at least two resource items according to corresponding resource item priorities, to obtain a sorting result;
   obtaining, when the center of the terminal user interface does not overlap the center of the area in which the target object resides, a first coordinate value used to identify the center of the terminal user interface, and a second coordinate value used to identify the center of the area in which the target object resides;
   determining a difference between the first coordinate value and the second coordinate value as an adjustment base; and
   performing, according to the adjustment base, layer-by-layer coordinate value adjustment on the at least two resource items according to the sorting result, an adjustment threshold used in the layer-by-layer coordinate value adjustment being generated according to the adjustment base, and different adjustment thresholds being used for different layers to which the at least two resource items belongs.

7. The terminal according to claim 6, wherein the processor is further configured to perform:
   performing the layer-by-layer coordinate value adjustment with positive adjustment thresholds if the first coordinate value is greater than the second coordinate value; and
   performing the layer-by-layer coordinate value adjustment with negative adjustment thresholds if the first coordinate value is less than the second coordinate value.

8. The terminal according to claim 5, wherein the processor is further configured to perform:
   obtaining a preset new resource item, the new resource item being different from the at least two resource items of the target object; and
   generating the dynamic rendering style of the target object according to the new resource item, the at least two resource items, and the resource item displacement strategy, the dynamic rendering style presenting a dynamic display effect that the target object follows the first operation to display or hide the new resource item on the terminal user interface.

9. A non-transitory computer storage medium storing computer executable instructions executable by at least one processor to perform:

rendering a target object in a first state on a terminal user interface;

detecting a first operation triggered in a browsing page in which the target object resides;

determining, according to a parameter generated by the first operation, a movement direction of the browsing page;

determining whether a center of the terminal user interface overlaps a center of an area in which the target object resides;

determining, when the center of the terminal user interface overlaps the center of the area, that a resource item displacement strategy includes moving the at least two resource items toward a direction matching the movement direction according to a same adjustment threshold;

determining, when the center of the terminal user interface does not overlap the center of the area, that the resource item displacement strategy includes moving the at least two resource items toward a direction matching the movement direction layer by layer according to different adjustment thresholds;

obtaining at least two resource items of the target object, each resource item being placed on one layer among multiple layers of the target object;

generating a dynamic rendering style of the target object according to the at least two resource items and the resource item displacement strategy; and switching to render the target object in a second state according to the dynamic rendering style, the second state presenting a dynamic display effect that the target object follows the first operation on the terminal user interface in a multi-layer unsynchronized manner.

10. The storage medium according to claim 9, wherein the generating a dynamic rendering style of the target object according to the at least two resource items and the resource item displacement strategy comprises:

sorting the at least two resource items according to corresponding resource item priorities, to obtain a sorting result;

obtaining, when the center of the terminal user interface does not overlap the center of the area in which the target object resides, a first coordinate value used to identify the center of the terminal user interface, and a second coordinate value used to identify the center of the area in which the target object resides;

determining a difference between the first coordinate value and the second coordinate value as an adjustment base; and performing, according to the adjustment base, layer-by-layer coordinate value adjustment on the at least two resource items according to the sorting result, an adjustment threshold used in the layer-by-layer coordinate value adjustment being generated according to the adjustment base, and different adjustment thresholds being used for different layers to which the at least two resource items belongs.

11. The storage medium according to claim 10, wherein the computer executable instructions further cause the at least one processor to perform:

performing the layer-by-layer coordinate value adjustment with positive adjustment thresholds if the first coordinate value is greater than the second coordinate value; and performing the layer-by-layer coordinate value adjustment with negative adjustment thresholds if the first coordinate value is less than the second coordinate value.

12. The storage medium according to claim 9, wherein the computer executable instructions further cause the at least one processor to perform:

obtaining a preset new resource item, the new resource item being different from the at least two resource items of the target object; and generating the dynamic rendering style of the target object according to the new resource item, the at least two resource items, and the resource item displacement strategy, the dynamic rendering style presenting a dynamic display effect that the target object follows the first operation to display or hide the new resource item on the terminal user interface.

* * * * *